(12) United States Patent
Takahashi et al.

(10) Patent No.: US 10,322,345 B2
(45) Date of Patent: Jun. 18, 2019

(54) GAME PROGRAM, GAME SYSTEM, AND GAME METHOD

(71) Applicant: KONAMI DIGITAL ENTERTAINMENT CO., LTD., Tokyo (JP)

(72) Inventors: Hiroaki Takahashi, Tokyo (JP); Yoshitaka Nishimura, Tokyo (JP)

(73) Assignee: KONAMI DIGITAL ENTERTAINMENT CO., LTD., Minato-ku, Tokyo (JP)

(*) Notice: Subject to any disclaimer, the term of this patent is extended or adjusted under 35 U.S.C. 154(b) by 14 days.

(21) Appl. No.: 15/176,781

(22) Filed: Jun. 8, 2016

(65) Prior Publication Data

US 2016/0279519 A1    Sep. 29, 2016

Related U.S. Application Data

(63) Continuation-in-part of application No. PCT/JP2014/082801, filed on Dec. 11, 2014.

(30) Foreign Application Priority Data

Dec. 11, 2013 (JP) ................................. 2013-256315

(51) Int. Cl.
*A63F 13/00* (2014.01)
*A63F 13/5375* (2014.01)
(Continued)

(52) U.S. Cl.
CPC ...... *A63F 13/5375* (2014.09); *A63F 13/2145* (2014.09); *A63F 13/42* (2014.09);
(Continued)

(58) Field of Classification Search
CPC .... A63F 13/44; A63F 13/814; A63F 13/5375; A63F 13/25; A63F 13/426; A63F 13/53;
(Continued)

(56) References Cited

U.S. PATENT DOCUMENTS

2002/0103031 A1* 8/2002 Neveu ...................... A63F 13/06
463/49
2002/0169014 A1* 11/2002 Egozy ...................... A63F 13/12
463/7
(Continued)

FOREIGN PATENT DOCUMENTS

CN      102612393 A     7/2012
JP      2003-205174 A   7/2003
(Continued)

OTHER PUBLICATIONS

"Tempest [Upright model] The Arcade Video Game PCB by Atari, Inc", Sep. 13, 2008, <"Tempest [Upright model] The Arcade Video Game PCB by Atari, Inc">.*
(Continued)

*Primary Examiner* — Justin L Myhr
(74) *Attorney, Agent, or Firm* — Sughrue Mion, PLLC

(57) ABSTRACT

A game program product may include, but is not limited to: a non-transitory computer-readable medium, and a computer program stored in the non-transitory computer-readable medium. The computer program is, when executed by a computer of a game system, to cause the computer to at least: display at least: 1) a reference indicator at a position over a display screen; and 2) a moving object which moves toward the reference indicator on the display screen; change a position of a reference indicator displayed at a position over the display screen; receive an input of a user's operation; and determine success or failure of the user's operation, based at least in part on: a timing of receiving the input of the user's operation, and a timing that the moving object reaches the reference indicator.

20 Claims, 13 Drawing Sheets

(51) Int. Cl.
    *A63F 13/42*     (2014.01)
    *A63F 13/814*    (2014.01)
    *A63F 13/56*     (2014.01)
    *A63F 13/44*     (2014.01)
    *A63F 13/2145*   (2014.01)

(52) U.S. Cl.
    CPC .............. *A63F 13/44* (2014.09); *A63F 13/56*
    (2014.09); *A63F 13/814* (2014.09)

(58) Field of Classification Search
    CPC .... A63F 13/537; A63F 13/5372; A63F 13/56;
        A63F 2300/638; A63F 2300/8047
    See application file for complete search history.

(56) References Cited

U.S. PATENT DOCUMENTS

| | | | | |
|---|---|---|---|---|
| 2010/0099473 A1* | 4/2010 | Ikejiri | .................... | A63B 69/36 463/3 |
| 2011/0105227 A1 | 5/2011 | Matsumoto et al. | | |

FOREIGN PATENT DOCUMENTS

| | | |
|---|---|---|
| JP | 3579042 B1 | 10/2004 |
| JP | 4309461 B2 | 8/2009 |
| JP | 2011-101752 A | 5/2011 |
| JP | 4691754 B2 | 6/2011 |
| JP | 2011-147594 A | 8/2011 |
| JP | 2012-50893 A | 3/2012 |
| JP | 5081492 B2 | 11/2012 |
| JP | 5270726 B2 | 8/2013 |

OTHER PUBLICATIONS

"define: parallal—Google Search", accessed May 16, 2018/, <https://www.google.com/search?q=define%3A+parallal&rlz=1C1GGRV_enUS769US769&oq=define%3A+parallal&aqs=chrome..69i57j69i58.3659j0j7&sourceid=chrome&ie=UTF-8>.*

Communication dated Jan. 31, 2018, from Korean Intellectual Property Office in counterpart application No. 10-2016-7014886.

Communication dated Nov. 20, 2018, from the State Intellectual Property Office of People's Republic of China in counterpart Application No. 201480067340.4.

* cited by examiner

US 10,322,345 B2

GAME PROGRAM, GAME SYSTEM, AND GAME METHOD

TECHNICAL FIELDS

The disclosure generally relates to a game program, a game system, and a game method.

BACKGROUNDS

In timing games, a determination is made regarding the success or failure of an operation made by a user with a timing that matches an object operated within a screen. For example, Japanese Patent No. 4691754 discloses a timing game in which an object moving in conjunction with the procession of a melody is displayed on a screen and, if an operation is made at the time of the object reaching a prescribed reference position on the screen, a determination of success is made, and the user is granted points. In such timing games, a user performs operations while waiting for the success/failure determination timing with watching an object that moves, such as flying toward a reference position that is constantly displayed on the screen, there have been cases in which the game is felt to be monotonous. Given this, it might be in some cases desirable to provide a presentation to a user that notifies of the timing, to enhance the enjoyment of the game.

SUMMARY

A game program product may include, but is not limited to: a non-transitory computer-readable medium, and a computer program stored in the non-transitory computer-readable medium. The computer program is, when executed by a computer of a game system, to cause the computer to at least: display at least: 1) a reference indicator at a position over a display screen; and 2) a moving object which moves toward the reference indicator on the display screen; change a position of a reference indicator displayed at a position over the display screen; receive an input of a user's operation; and determine success or failure of the user's operation, based at least in part on: a timing of receiving the input of the user's operation, and a timing that the moving object reaches the reference indicator.

BRIEF DESCRIPTIONS OF THE DRAWINGS

DETAILED DESCRIPTIONS

Embodiments

Figure 1:
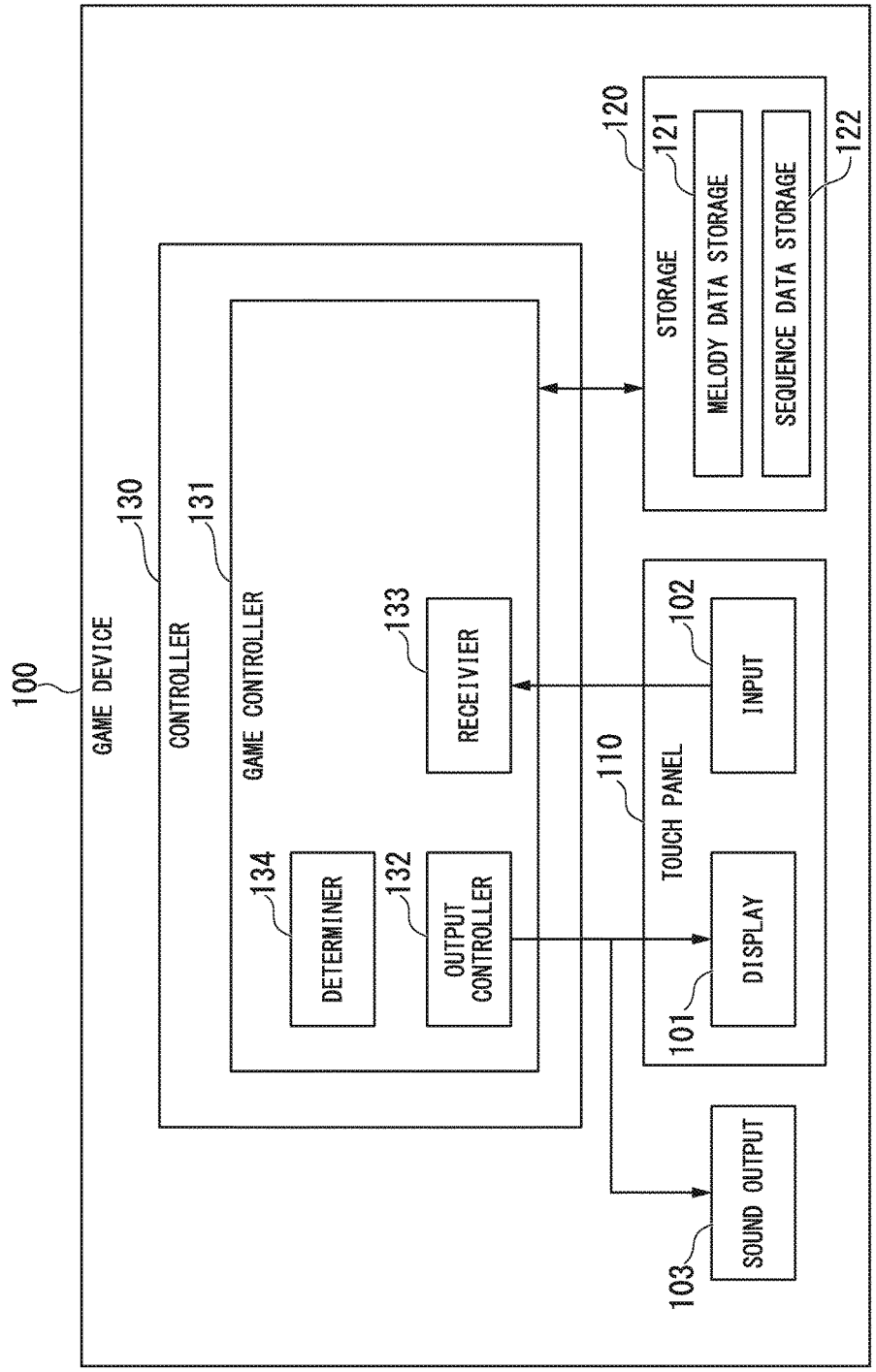
FIG. 1 is a block diagram showing an example of the constitution of a game device according to a first embodiment of the present invention.

In some embodiment, a game program product may include, but is not limited to: a non-transitory computer-readable medium, and a computer program stored in the non-transitory computer-readable medium. The computer program is, when executed by a computer of a game system, to cause the computer to at least: display at least: 1) a reference indicator at a position over a display screen; and 2) a moving object which moves toward the reference indicator on the display screen; change a position of a reference indicator displayed at a position over the display screen; receive an input of a user's operation; and determine success or failure of the user's operation, based at least in part on: a timing of receiving the input of the user's operation, and a timing that the moving object reaches the reference indicator.

In some cases, the computer program is, when executed by the computer, to cause the computer to: further receive an input of user's instructions for changing the position of the reference indicator over the display screen, and wherein changing the position of the reference indicator comprises changing the position of the reference indicator in accordance with the user's instructions.

In some cases, the computer program is, when executed by the computer, to cause the computer to further: display a change indicator that indicates a timing of changing the position of the reference indicator, and determine success or failure of the change in position of the reference indicator, based at least in part on: a timing of receiving the input of user's instructions for changing the position of the reference indicator and the timing of changing the position of the reference indicator, which is indicated by the change indicator.

In some cases, the computer program is, when executed by the computer, to cause the computer to further: change a movement speed of the object which is moving toward the reference indicator upon changing the position of the reference indicator.

In some cases, the computer program is, when executed by the computer, to cause the computer to further: display a plurality of moving objects which move toward the reference indicator in different directions from an outside area surrounding the reference indicator; and changing a size of the reference indicator for changing positions of the outside edge of the reference indicator.

In some cases, the computer program is, when executed by the computer, to cause the computer to further: move the reference indicator over the display screen for changing positions of the outside edge of the reference indicator.

In some cases, the computer program is, when executed by the computer, to cause the computer to further: display, on the display screen, the reference indicator as a constant reference indicator continuously during a game time period and a temporary reference indicator temporarily in the game time period; display, on the display screen, a surrounding object which surrounds the temporary reference indicator; make the surrounding object shrink toward the temporary reference indicator; make a first success failure determination, based at least in part on: the timing of receiving the input of the user's operation, and a timing that the moving object moving toward the constant reference indicator reaches the constant reference indicator; and make a second success failure determination, based at least in part on: the timing of receiving the input of the user's operation, and a timing that the moving object shrinking toward the temporary reference indicator reaches the temporary reference indicator.

In another embodiment, a game system may include, but is not limited to, a display that displays at least: 1) a reference indicator at a position over a display screen; and 2) a moving object which moves toward the reference indicator on the display screen; a controller configured to change a position of a reference indicator displayed at a position over the display screen; a receiver configured to receive an input of a user's operation; and a determiner configured to determine success or failure of the user's operation, based at least in part on: a timing of receiving the input of the user's operation, and a timing that the moving object reaches the reference indicator.

First Embodiment

First, the first embodiment will be described. FIG. 1 is a block diagram showing the constitution of a game device 100 according to the present embodiment. The game device 100 is a terminal on which a user plays a game, this being, for example, a computer such as an arcade or commercial game machine, a mobile telephone handset, such as a smartphone, a PC (personal computer), a table PC, or game equipment. The game device 100 has a touch panel 110 that includes a display 101 and an input 102, a sound output 103, a storage 120, and a controller 130.

The display 101 is a display device having a screen that displays information such as images and characters.

The input 102 is an input device that generates an input signal in response to an operation by a user.

For example, the input 102 is a keyboard or buttons, a pointing device such as a mouse, a touch panel, or the like. In the present embodiment, the example described is one in which a touch panel 110 on which the user makes operations integrates the display 101 and the input 102 as one. The operating method of the touch panel 110 may be any one of a resistive film type, a surface acoustic wave type, infrared type, electromagnetic induction type, and capacitive type, or the like.

If a keyboard is used as the input 102, prescribed keys of the keyboard are assigned to prescribed operation inputs, and an input is received by sensing the operation of that key. If buttons are used as the input 102, one or a plurality of buttons are provided corresponding to operations required in a game, and an input is received when the pressing of that button is sensed. If a pointing device is used as the input 102, an input is received when a cursor displayed on the display 101 is appropriately moved and the pointing device is clicked.

The sound output 103 is a speaker that outputs sound.

Figure 2:
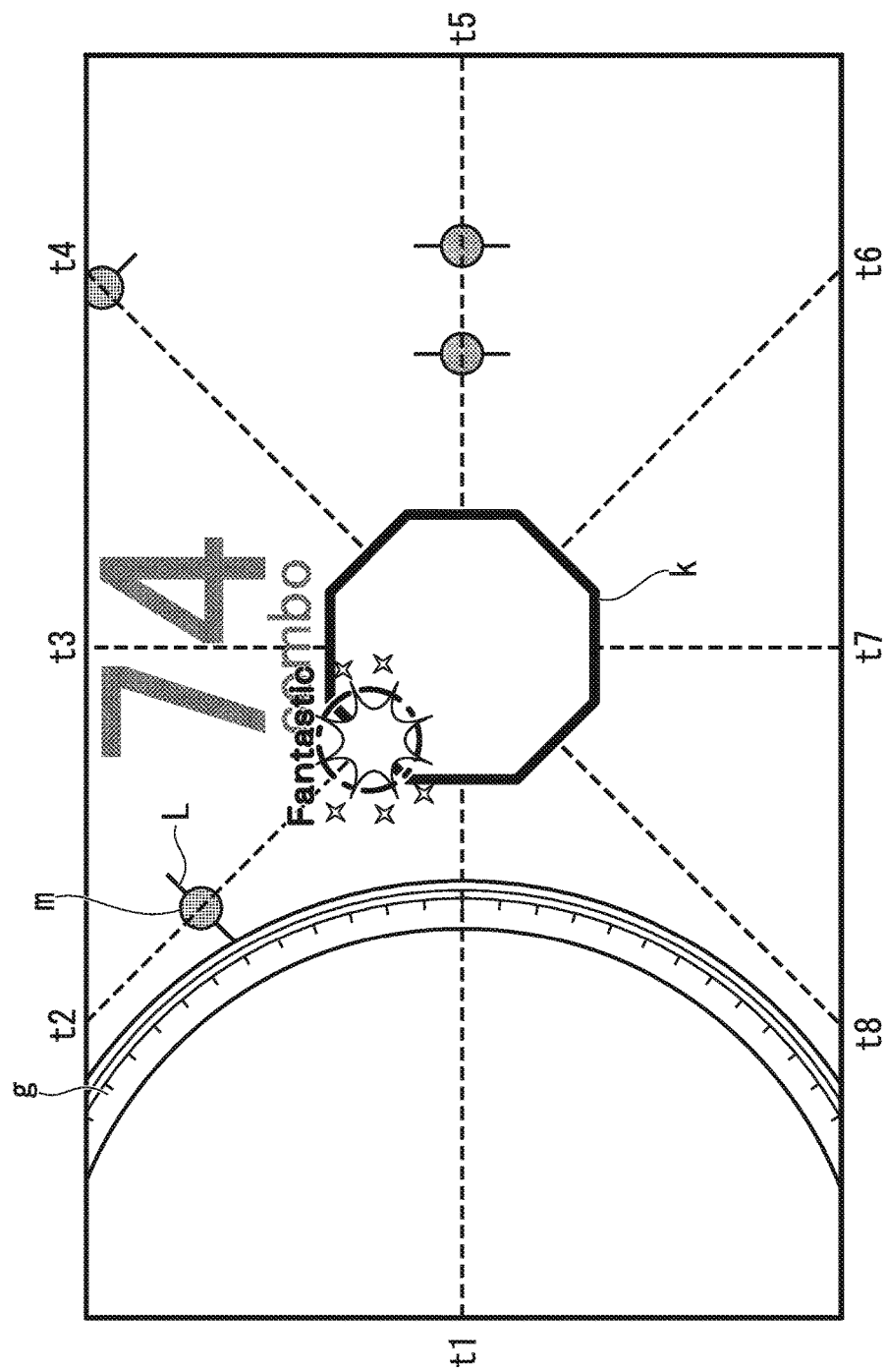
FIG. 2 is a drawing showing an example of the game screen according to the first embodiment of the present invention.

A game provided by the game device 100 in the present embodiment will now be described. FIG. 2 shows an example of a game displayed on the screen of the touch panel 110. In the present embodiment, the game provided by the game device 100 is a timing game, in which a success/failure determination is made in accordance with a prescribed operation input from the user at a time matched to an object operating in a screen together as a melody progresses. In this timing game, the game device 100 displays at the prescribed position on the screen the constant reference indicator k, which is the reference indicator, displays the moving object m, which moves toward the constant reference indicator k, and receives input of a prescribed operation from a user and performs a success/failure determination based on the time of the reception of the input operation and on the arrival time at which the moving object m, which moves toward the constant reference indicator k, reaches the constant reference indicator k. If the result of the success/failure determination is success, a reward is granted to the user. Although the reward will be, for example, described as being points, it may be some type of item or the like in the game. In the present embodiment, the prescribed operation is the operation of touching a touch panel (hereinafter, referred to as a touch operation).

In the example shown in this drawing, an octagonal constant reference indicator k is displayed in the center of a rectangular screen in landscape format, and moving objects m which move from outside the screen toward the constant reference indicator k along paths (path t1, path t2, path t3, path t4, path t5, path t6, path t7, and path t8) extending perpendicularly toward outside the screen from each side of the constant reference indicator k. For example, if the user makes a touch operation at the time of one such moving object m reaching the constant reference indicator k, the moving object m is displayed to appear shining at the constant reference indicator k. In the example of the drawing, a touch operation is made at the time at which the moving object m reaching the constant reference indicator k on the path t2, resulting in a display there of the character string Fantastic. Although the paths are indicated by dotted lines in the drawing for the purpose of describing the paths, there is no restriction to dotted lines, and the paths need not be displayed on the screen.

By doing this, it is possible to provide a dynamic game, in which a large screen is used dynamically, thereby enabling heightening of game enjoyment. That is, in conventional timing games, there are ones, for example, in which an object drops from above, falling toward a reference line that extends to the left and right at the bottom of the screen, and the time of the object reaching the reference line informs the user of the time to make an operation. In such a timing game, the user's view is mainly fixed on the vicinity of the reference line during play. In contrast, according to the present embodiment, because the moving objects m appear from outside the screen and move toward the constant reference indicator k at the center of the screen, the user moves his or her view over the entire area of the screen. Accordingly, it is necessary to make more dynamic checking of the screen and operation is required, enabling a heightening of game enjoyment.

By doing this, the game device 100 can guide the user regarding the time at which an input of a prescribed operation should be made by the time of a moving object m appearing from outside the screen reaching the constant reference indicator k existing at the center of the screen. This provides a new presentation and effect for notifying the user of the timing to make an operation, and enables a heightening of game enjoyment.

In the example in this drawing, the moving objects m moving toward the constant reference indicator k has a line segment L, displayed penetrating the moving object though its center and parallel to the side of the constant reference indicator k the moving object is moving toward. When a moving object m approaches the constant reference indicator k, such a line segment L facilitates the visual grasping by the user of the relative timing relationship with the timing of other moving objects m toward the adjacent side when the moving object m reaches the constant reference indicator k. However, the line segment L need not be displayed.

During the game time period, from the start to the end of reproduction of a melody, the game device 100 displays a moving object at a plurality of times matched to the rhythm or cadence of a melody and calculates the score based on the determination result at each of the timings. When doing this, for example, the game can be determined to have been cleared based on the determination result or score at each of the timings, and a cleared gage g serving as an indicator of game clearing can be displayed on the screen. The cleared gage g can, for example, be displayed to move up and down based on the determination result at each of the times, and can indicate game cleared if at the end of the game gage is above a prescribed point. If successes repeat continuously in the determination result, a special score may be added based on the number of continuous repetitions. This number of continuous repetitions may be displayed on the screen as a combo. In the example in the drawing, the number of continuous repetitions is displayed as 74 as the combo value at the top of the constant reference indicator k.

Additionally, in the present embodiment, in a timing game such as this, the position of the constant reference indicator k within the screen is changed. There are cases in which the position of the constant reference indicator k is changed, that is, the case in which the position of the constant reference indicator k is moved, and the case in which the size of the constant reference indicator k is enlarged or reduced. The position of the constant reference indicator k may be changed automatically by the game program in response to the build-up of the melody or the game situation, or the position of the constant reference indicator k may be moved to an arbitrary position in response to a an operation input from the user.

Doing this, for example, it is possible for a user to change the position of the constant reference indicator k toward which the moving objects m move to a position that facilitates operation by the user, thereby enabling the operability of the game to be improved. Additionally, it is also possible to afford the user the enjoyment of deciding a strategy regarding to what position the constant reference indicator k should be moved for easy operation, in accordance with the melody or game situation, thereby enabling a heightening of game enjoyment.

Additionally, doing this enables the provision of a dynamic game in which a large area of the screen is dynamically used, thereby enabling a heightening of game enjoyment.

Additionally, by moving the view over the entire screen, the user can view the entire screen, enabling the user to be shown an entire video, for example, when a video for a PV of the melody (promotional video or music video) or advertisement is streamed as the background of the screen.

The constitution of a game device 100 that provides such as game will be described in detail below.

Returning to FIG. 1, the storage 120 is constituted by a storage medium such as a RAM (random access memory), ROM (read only memory), an HDD (hard disk drive), or the like or the combination thereof, and stores various programs and information for the purpose of controlling various parts of the game device 100. The storage 120 has a melody data storage 121 and a sequence data storage 122.

The melody data storage 121 stores melody data that will be the game target.

The sequence data storage 122 stores sequence data that describes the arrival times at which the user should input operations and the movement path of the moving object, to match the progression of the melody.

Figure 3:
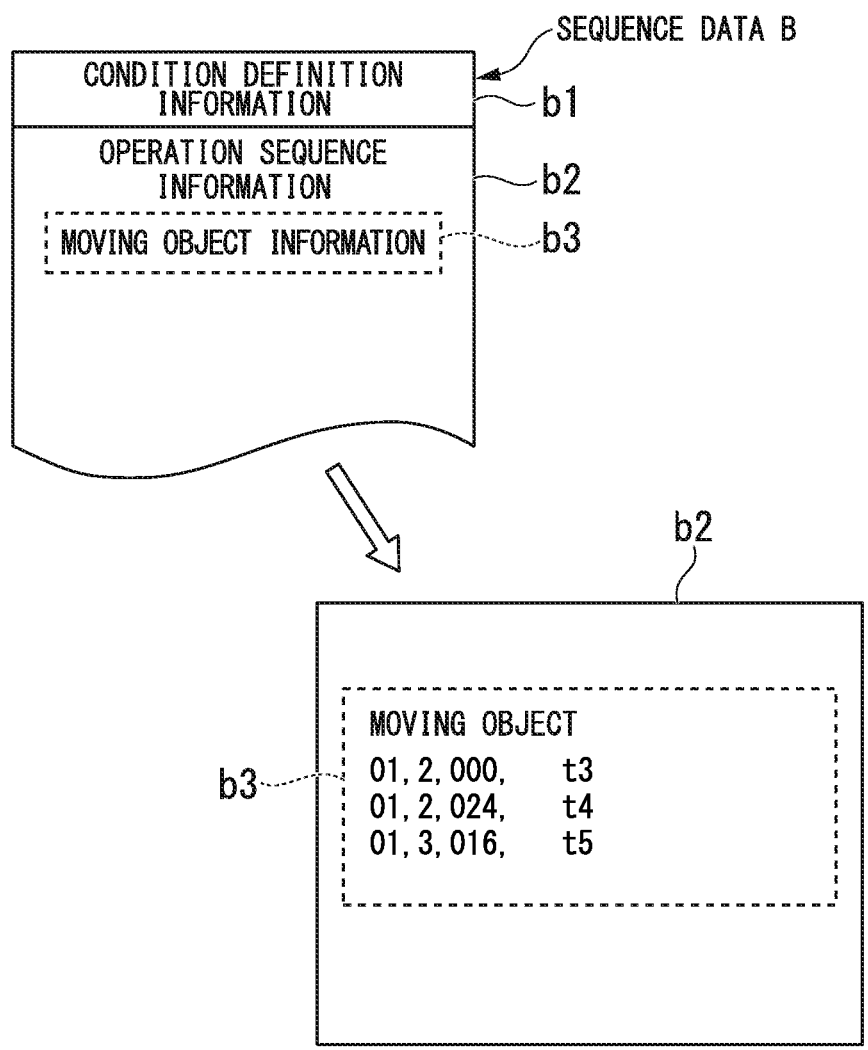
FIG. 3 is a drawing showing an example of the contents of sequence data according to the first embodiment of the present invention.

At this point, the details of the sequence data will be described, with reference made to the drawing. FIG. 3 shows an example of the contents of the sequence data b. As shown in the drawing, the sequence data b includes the condition definition information b1 and the operation sequence information b2. Information indicating various conditions for executing a game, such as the melody ID for identifying the melody, the music tempo, the beat, the track, and the melody length are coded into the condition definition information b1.

The arrival times within the melody, at which touch operations are to be made at the reference indicator, are coded in association in the operation sequence information b2. The operation sequence information b2 includes moving objection information b3, which is used to display moving object within the screen.

The moving object information b3 includes, for each moving object to be caused to appear during the melody, the arrival timing of arrival of the moving object at the constant reference indicator and path identification information identifying the path on which that moving object moves toward the constant reference indicator. The moving object information b3 is constituted by a set of a plurality of records, in which this information is associated with each other. In the example of the drawing, the information is coded, from the left, as the arrival time and the path identification information, in that sequence.

The arrival times are coded as values indicating the bar number within the melody, the beat number, and the time within a beat, separated by commas. The time within a beat is the elapsed time from the start of a beat, expressed as the number of units of time from the start, when the length of a beat is divided evenly into n units of time. For example, if n=96, the time of the fourth beat of the first bar of a melody and when ⅛ from the start of the beat has elapsed from the start of that beat would be coded as "01, 4, 012".

The path identification information that identifies, of the plurality of paths of the constant reference indicator k leading toward side thereof, the path over which the corresponding moving object arrives at the arrival time. For example, eight paths are identified, respectively, as path t1, path t2, path t3, path t4, path t5, path t6, path t7, and path t8. In this example, the path identification information, which is path t1, path t2, path t3, path t4, path t5, path t6, path t7, and path t8, corresponds to the reference symbols applied to the paths in FIG. 2, and identify the side of the constant reference indicator k toward which the moving object m moves. An output controller 132 moves a moving object m toward the side of the constant reference indicator k identified by such path identification information.

The controller 130 has an information processing device such as a CPU (central processing unit) that functions as the control center of the game device 100 and controls the various parts of the game device 100. The controller 130 has a game controller 131. The game controller 131 is constituted so as to read out a game program stored beforehand in the storage 120. The game controller 131 has an output controller 132, an acceptor 133, and a determiner 134.

The output controller 132 controls the sound output of the sound output 103 and the image output of the touch panel 110. For example, when a user selects a melody for playing a game, the output controller 132 reads out and outputs to the sound output 103 the selected melody data from the melody data storage 121 so as to reproduce the sound. The output controller 132 displays the above-described game screen on the screen of the touch panel 110. The output controller 132 reads out sequence data that is stored in the sequence data storage 122 in association with the reproduced melody. The output controller 132 determines the arrival times included with a prescribed time range moving forward from the current time, based on the sequence data, displays the constant reference indicator and the moving object on the screen at an appearance time resulting from subtracting a prescribed time (for example, two bars) from each determined time, and accompanying the reduction in the time difference between each of the arrival times and the current time, causes a relative displacement so that the distance between each of the moving objects and the constant reference indicator is reduced with the shrinking of each of the moving object toward the reference, thereby providing a guide of the arrival time.

The output controller 132 also displays on the screen the constant reference indicator k that is to be displayed at a prescribed position on the screen and moving objects m that move toward the constant reference indicator k. In this case, the output controller 132 displays a plurality of moving objects m moving toward the constant reference indicator k in a plurality of directions from an outside area surrounding the constant reference indicator k.

The output controller 132 changes the position of the constant reference indicator k on the screen, either automatically, based on the game program, or in response to a received control instruction input from the user by the acceptor 133 that receives input from the user.

For example, the output controller 132, by either enlarging or reducing the size of the constant reference indicator k, changes the position of the constant reference indicator k. In this case, if the position of the constant reference indicator k is to be enlarged or reduced in response to an received control instruction input from the user by the acceptor 133, the constant reference indicator k is either enlarged or reduced in the size of a pinch-in or pinch-out in response to control instruction in which the area of the side of the constant reference indicator k is pinch-in or pinch-out. A pinch-in is, for example, the operation of movement of the touching of the touch panel 110 by two fingers and the pinching inward of the two fingers to reduce the spacing therebetween, while maintaining the touched condition, this being referred to also as a pinch-close or the like. A pinch-out is the operation of moving, for example, by touching of the touch panel input 102 by two fingers and the pinching outward of the two fingers to increase and open the spacing therebetween, while maintaining the touched condition, this also being referred to as a pinch-open or the like.

Alternatively, the output controller 132 changes the position of the constant reference indicator k by moving the position of the constant reference indicator k. In this case, if the position of the constant reference indicator k is to be moved in response to an received control instructions input from the user by the acceptor 133, for example, a touch operation is made at a position on the inside of the constant reference indicator k and a slide operation (referring to an operation of changing the touch position while maintaining the touch condition) is made to move the position of the constant reference indicator k in the slide direction.

When changing the position of the constant reference indicator k, the output controller 132 changes the movement speed with which the moving objects m move toward the constant reference indicator k. That is, a timing game such as this provides a guide to the operation time by the time of moving objects m moving toward the constant reference indicator k arriving at the constant reference indicator k. For this reason, if at the point in time at which the position of the constant reference indicator k is changed there are already one or more moving objects m on the screen, the speed of movement of that moving object m is adjusted so that the moving object m arrives at the constant reference indicator k at the prescribed arrival time. The constant reference indicator k is optionally set at any position over the display screen. The position of the constant reference indicator k stays fixed unless the position is displaced to another position. After the constant reference indicator k was once set at a position over the display screen, the constant reference indicator k can be displaced to a different position. Displacement over the display screen of the constant reference indicator k changes the distance between the constant reference indicator k and the movement object. The distance between the constant reference indicator k and the movement object may be defined between closest points on the peripheral edges of the constant reference indicator k and the movement object. The movement speed of the moving object is changed depending upon the change of the distance between the constant reference indicator k and the movement object so that it arrives at the constant reference indicator k at the prescribed arrival time. For example, if the distance from a moving object m to the constant reference indicator k is lengthened, the movement speed of the moving object m is increased so that it arrives at the constant reference indicator k at the prescribed arrival time. If, however, the distance from the moving object m to the constant reference indicator k is shortened, the movement speed of the moving object m is decreased so that it arrives at the constant reference indicator k at the prescribed arrival time.

The acceptor 133 receives input of an operation made from the user with respect to the input 102. For example, the acceptor 133 receives a touch operation at an arbitrary operation position on the screen. The acceptor 133 receives input of a control instruction to change the position of the constant reference indicator. For example, the acceptor 133 receives input of a control instruction to enlarge or reduce the size of the constant reference indicator k by the pinching in or pinching out of a part around the constant reference indicator k. And, for example, the acceptor 133 receives input of a control instruction to change the position of the constant reference indicator k by making a touch operation within the constant reference indicator k and then sliding.

The determiner 134 makes a success/failure determination based on the time of an operation received as input by the acceptor 133 and the arrival time of the moving object m moving toward the constant reference indicator k reaching the constant reference indicator k.

In the success/failure determination, the determiner 134 performs position determination processing based on the operation position at which a touch operation was performed and timing determination based on the operation time at which the touch operation was performed. For example, the determiner 134 performs position determination processing according to the positional relationship between the operation position at which a touch operation was made, the position of the constant reference indicator k, and the position of the moving object m at that time. Specifically, the determiner 134 determines a success if the constant reference indicator k exists in a prescribed range from the operation position at which a touch operation was made and also a moving object m exists, and determines a failure if either the constant reference indicator k does not exists within the prescribed range or a moving object m does not exist.

When success is determined in the position determination processing, the determiner 134 performs timing determination processing that determines a success if the operating time and the arrival time are within a prescribed range, and determines failure if they are not within the prescribed range. In this case, the determiner 134 can make determination of different evaluations in a plurality of steps, in accordance with the difference between the operation time and the arrival time. For example, dividing the success determination into three steps, the determination can be made so that if the difference between the operation time and the arrival time is 0.0 second or greater and within 0.2 second, the determination result is "Fantastic", if the difference is 0.21 second or greater and within 0.4 second, the determination result is "Great", if the difference is 0.41 second or greater and within 0.8 second, the determination result is "Good", and if the difference is 0.81 second or greater, the determination result is failure.

Next, an example of the operation of the game device 100 according to the present embodiment will be described, with references made to the drawings.

Figure 4:
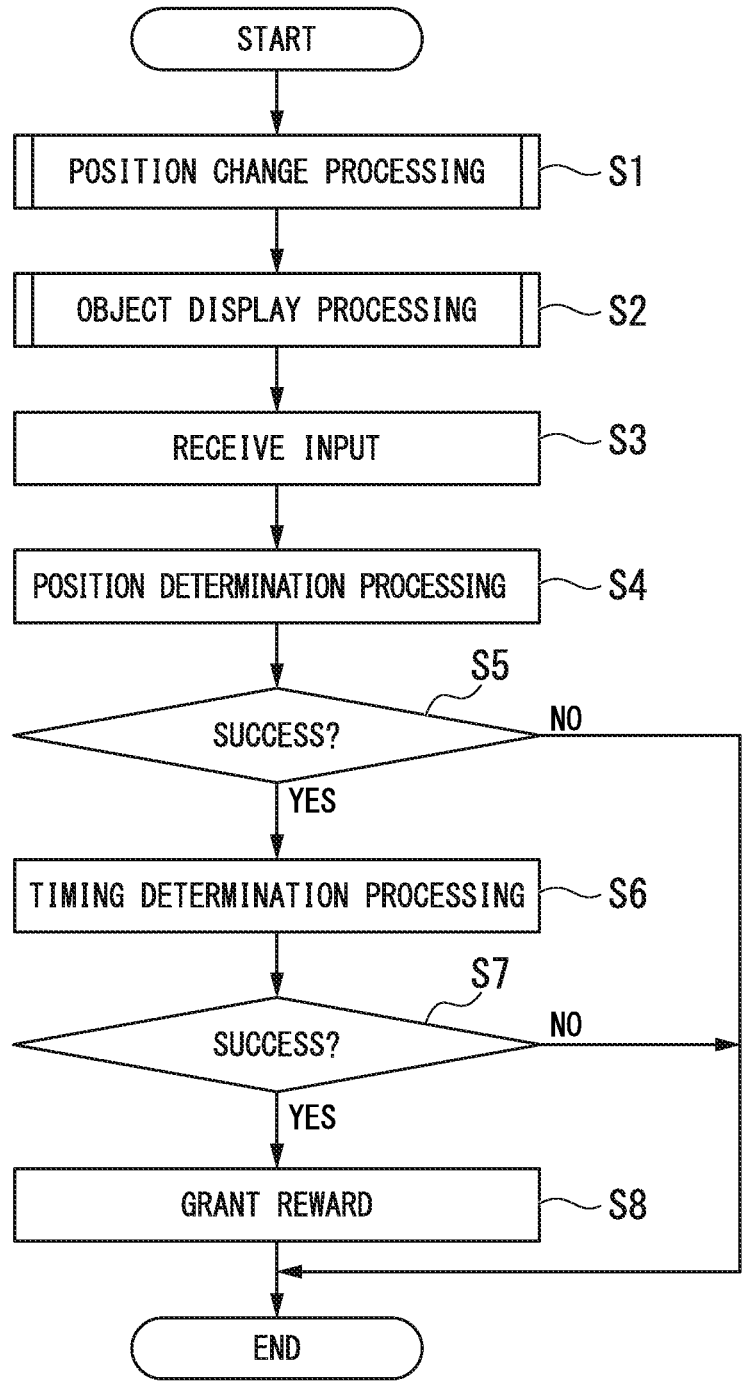
FIG. 4 is a flowchart showing an example of operation of a game device according to the first embodiment of the present invention.

FIG. 4 is a flowchart showing an example of the operation of the game device 100 according to the present embodiment.

When the starting of a game provided by the game device 100 is selected by the user and the melody to be played is selected, the output controller 132 displays a game screen that includes a constant reference indicator k, reads out the selected melody data from the melody data storage 121, causes the sound output 103 to output and to reproduce the melody, reads out the sequence data corresponding to the melody from the sequence data storage 122, and starts the game.

During the game time period from the start of reproduction of the melody to the end thereof, the game controller 131 continuously repeats execution of the processing from step S1 to step S8.

Figure 5:
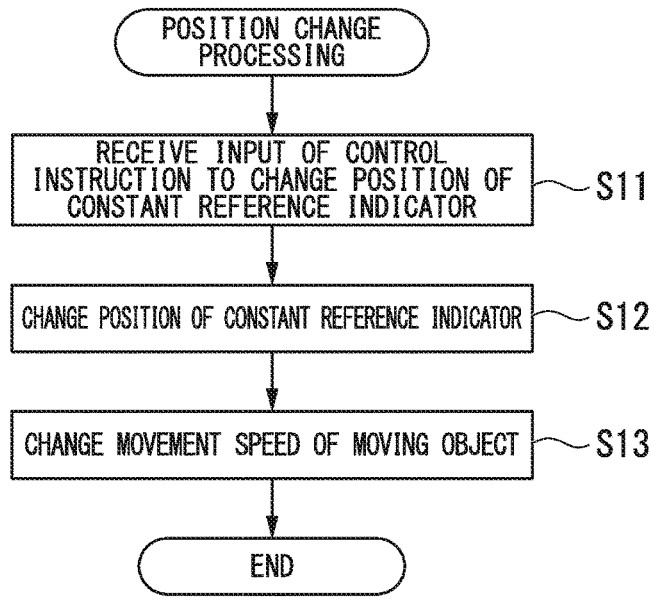
FIG. 5 is a flowchart showing an example of operation of position change processing according to the first embodiment of the present invention.

The output controller 132 starts position change processing of the constant reference indicator k displayed on the screen (step S1). FIG. 5 is a flowchart showing an example of the operation in the position change processing by the game device 100.

The acceptor 133 receives input of a control instruction to change the position of the constant reference indicator k by an operation made with respect to the input 102 (step S11). The output controller 132, in response to control instruction input received by the acceptor 133, changes the position of the constant reference indicator k (step S12). If there are already one or more moving objects m that is displayed at that time, the output controller 132 changes the movement speed of that moving object m and moves the moving object m toward the constant reference indicator k at the changed movement speed (step S13).

Returning to FIG. 4, the output controller 132 starts object display processing to display the moving object on the touch panel 110 based on the sequence data and in accordance with the progression of the melody (step S2).

Figure 6:
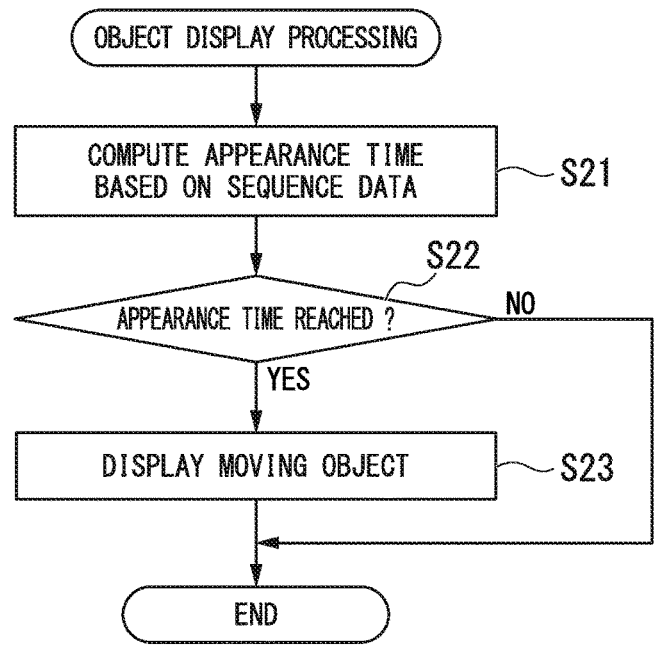
FIG. 6 is a flowchart showing an example of operation of object display processing according to the first embodiment of the present invention.

FIG. 6 is a flowchart showing an example of the operation of object display processing by the game device 100.

When the reproduction of the melody starts, the output controller 132 starts keeping time, referenced to the time at which the melody reproduction starts and computes the appearance time of the moving object, based on the sequence data read out from the sequence data storage 122 (step S21). For example, the output controller 132 computes the appearance time by subtracting a prescribed amount of time from the arrival time included in the sequence data.

The output controller 132 compares the computed appearance time with the elapsed time from the start of melody reproduction and ends processing if it determines that the appearance time has not arrived (NO at step S22). If the determination is that the appearance time has arrived (YES at step S22), the moving object m is displayed on the path indicated by the path identification information corresponding to that appearance time and is moved so that the moving object m arrives at the constant reference indicator k at the arrival time (step S23). When the arrival time has elapsed, the output controller 132 deletes the display of the moving object that had been displayed at step S23.

Returning to FIG. 4, when the output controller 132 starts the object display processing, the input 102 receives input of touch operations from the user in response to the progression of the melody (step S3). The determiner 134 performs position determination processing based on the input touch operations (step S4).

If the determine of success is made in the position determination processing (YES at step S5), the determiner 134 performs timing determination processing (step S6). If the determiner 134 determines success in the timing determination processing (YES at step S7), the game controller 131 grants a reward to the user (step S8). If a determination of failure is made at the position determination processing of step S4 or at the timing determination processing of step S6 (NO at step S5 or NO at step S7), a reward is not granted.

As described above, according to the present embodiment, in a timing game that makes a success/failure determination by touch operations in accordance with the progression of a melody, a constant reference indicator k toward which moving objects m move in a plurality of directions outside the screen is displayed, and guidance is given regarding the operation time by the time of the moving objects m arriving at the constant reference indicator k. This enables the provision of new game enjoyment.

Additionally, because the position of such a constant reference indicator k has been made changeable, it is possible to provide a timing game that makes effective use of a large screen area and to provide a new game enjoyment of the user changing the position of the constant reference indicator k in accordance with the game situation or the like.

Figure 7:
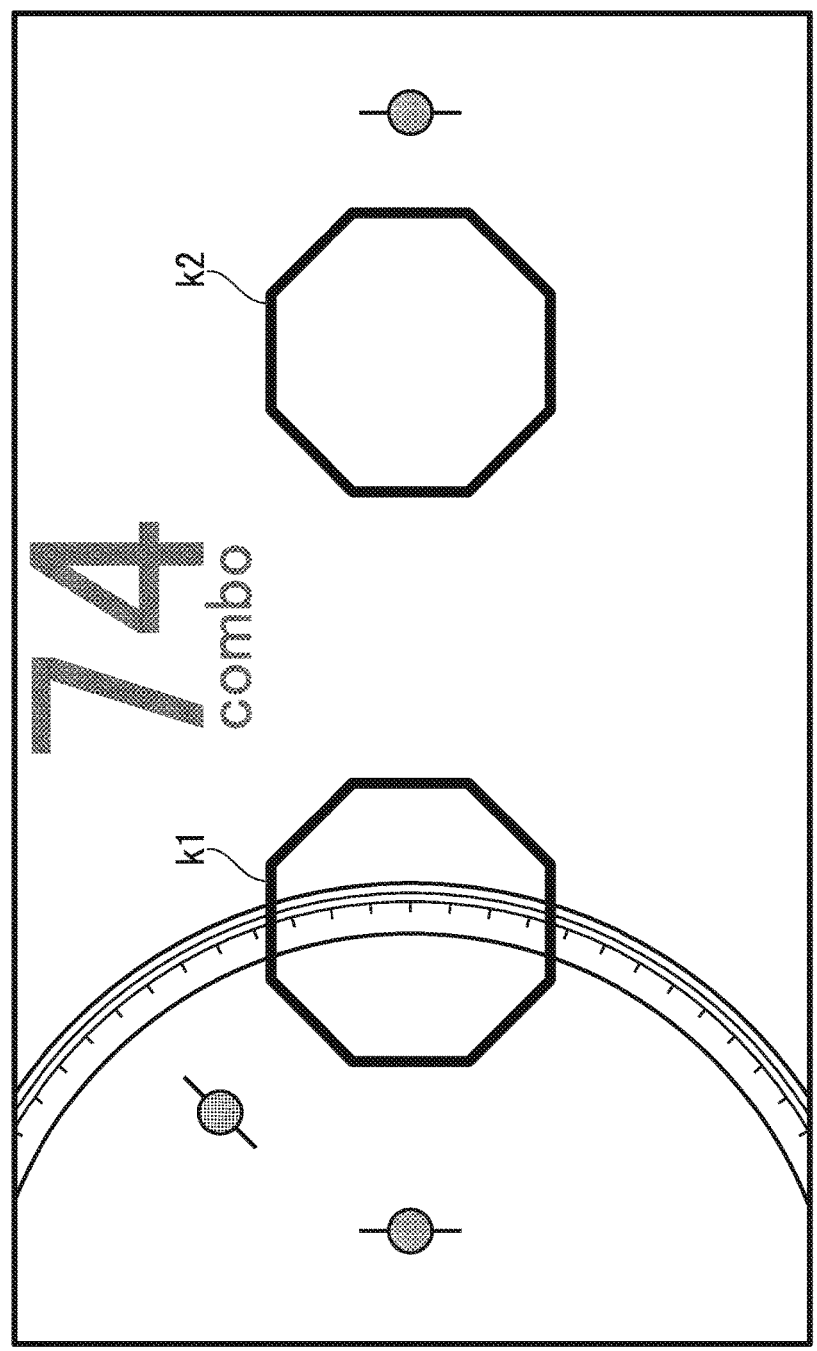
FIG. 7 is a drawing showing an example of a game screen on which a plurality of constant reference indicators is displayed according to the first embodiment of the present invention.

Although the description in the above example has been of the case of the output controller 132 moving the position of the constant reference indicator k and the case of the output controller 132 enlarging or reducing the size of the constant reference indicator k as examples of changing the position of the constant reference indicator k, other forms may be included. For example, the output controller 132 can also change the position of the constant reference indicator k by reproducing the constant reference indicator k and displaying a plurality of constant reference indicators k. FIG. 7 shows an example of a game screen in which the output controller 132 displays on the display 101 a plurality of constant reference indicators k, these being the constant reference indicator k1 and the constant reference indicator k2. Reproduction such as this may be performed, for example, either automatically by a computer program at a prescribed time within the melody, or in response to an operation from the user.

For example, if reproduction is to be done automatically by a computer program, at a prescribed time matched to the rhythm or cadence of a melody, one constant reference indicator k is split into two, moving both left and right as the constant reference indicator k1 and the constant reference indicator k2, moving to and remaining stationary at the positions shown in the drawing. The plurality of constant reference indicators k reproduced in this manner may be controlled so that, with a prescribed timing matched to the rhythm or cadence within the melody, they return to being one again.

Alternatively, if the constant reference indicator k is to be reproduced in response to an operation from the user, if a prescribed operation is made with respect to the input 102 (for example, if a pinch-out operation is made from a position within the prescribed region from the center of the constant reference indicator k, which is a position corresponding to the inside of the constant reference indicator k, toward the outside) a plurality of constant reference indicators k are displayed at positions according to the operation. For example, when reproducing constant reference indicators k using a pinch-out operation with two fingers, a constant reference indicator k1 and a constant reference indicator k2 will be displayed, respectively, at the positions of the two fingers after the pinch-out operation. The plurality of constant reference indicators k reproduced in this manner may be controlled to return to one again by a prescribed operation from the user (for example, a pinch-in operation so that the plurality of constant reference indicators k overlap to be one.

In this case, a plurality of constant reference indicators k reproduced at a prescribed time by a computer program may be controlled so as to return to one in response to an operation from the user, and a plurality of constant reference indicators k reproduced in response to an operation from the user may be controlled to return to one at a prescribed time by a computer program.

Also, a plurality of constant reference indicators k may be displayed with different colors. The same is true with regard to moving objects m moving toward the plurality of constant reference indicators k, and a moving object m that can be displayed with the same color as the constant reference indicator k toward which it moves (a color different from a moving object m moving toward a constant reference indicator k different from the one toward which it is moving).

In this case, although the example of two constant reference indicators k being displayed on the left and right has been shown, three or more constant reference indicators k may be displayed, and a plurality of reproduced constant reference indicators k may be moved to arbitrary positions top and bottom or in an inclined direction.

Although the above-described examples have shown octagonal constant reference indicators, the constant reference indicators may be any shape, as long as they are such that the moving object reaches them. For example, they may be polygonal, such as triangular or square, or circular, and the moving objects may move toward each of the sides or the circumference of these shapes.

Although in the above-described example the path of movement of a moving object has been shown by example to be a straight line, it may be a curved line or piecewise-linear line.

Although in the above-described examples a plurality of paths along which moving objects move toward each side of the constant reference indicator are shown, if a user plays the game by making a touch operation on the constant reference indicator at the center of the game screen such as this, it can be envisioned that moving objects appearing from the paths at the bottom part of the screen (for example, path t6, path t7, and path t8) will be difficult to see, because of being hidden by the hand or arm of the user. Given this, if a moving object is appearing from a path at the bottom of the screen, for example, a display may be made in the area of the constant reference indicator to notify that a moving object has appeared. For example, an arrow indicator can be displayed at the side toward the moving object that has appeared, or the side toward which the moving object that has appeared is moving can be temporarily changed.

When a plurality of moving objects are displayed on the screen simultaneously, if there is a combination of a plurality of moving objects having arrival times that are the same, the moving objects that belong to that combination can be displayed with a color that is different from that of other moving objects. This facilitates an understanding by the user of a combination of a plurality of objects having the same arrival time.

Also, a moving object moving toward a constant reference indicator may be made to appear from the outer edge of the screen, or the appearance position may be controlled so that the elapsed time from the appearance of a moving object on the screen until it arrives at the constant reference indicator is substantially the same, even if the paths differ. For example, if the screen is the landscape format, the left and right paths (for example, path t1 and path t5) are longer than the up and down paths (for example, path t3 and path t7). If a moving object is made to appear from the outer edge of the screen for all of these, it can be envisioned that the user will have difficulty determining the arriving time. The reason for this is that even while a user is gazing at the constant reference indicator k, the user catches view of a moving object appearing at the edge of the field of view, and because it can be thought that the user is either consciously or unconsciously determining the time of arrival matched to the appearance time, because of the difference in paths, if the elapsed times from the appearance time to the arrival time differ, making it difficult to determine the time of arrival. Given this, for example, moving objects appearing from the left and right paths (for example, path t1 and path t5) may be made to appear not from the outer edge of the screen, but rather at positions within the screen that are a distance that is substantially the same as the distance from the constant reference indicator at which moving objects on other paths (for example path t3 and path t4) appear.

In addition to the above-described determination method, regarding the success/failure determination, the determiner 134 may determine based on the determination method noted below.

In addition to measuring the degree of coincidence between the time at which a touch operation was made and the time at which the touch operation should have been made and between the touch operation position and the position at which the touch operation should have been made, and performing a timing determination by evaluating whether or not the time offset is within a prescribed time range, the determiner 134 may make a position determination by evaluating whether or not the touch operation position and the position at which the touch operation should have been is within a prescribed position range. There is no particular restriction regarding the sequence of the timing determination and the position determination. As described above, if a determination of a success is made in the position determination, the timing determination may be performed. Conversely, if a determination of a success is made in the timing determination, the position determination may be made. Alternatively, the timing determination and the position determination may each be performed separately, and the final determination made by the combination of the results from the determination of each. That is, the timing determination and the position determination may be made separately, a final determination of a success being made only when the timing determination succeeds and also the position determination succeeds, and a final determination of failure being made if either one or both thereof fail. The prescribed time period range used in the determination may be one time period range, and may be a plurality of different time period ranges. That is, a plurality of evaluations in accordance with the time period may be enabled. In the same manner, the prescribed position range used in the determination may be one position range, and may be a plurality of different position ranges. That is, a plurality of evaluations in accordance with the position may be enabled.

The distance between the position of the center point of a moving object m at the time that a touch operation was made and the determination position corresponding to the constant reference indicator k may be measured, and an evaluation may be made in accordance with that distance. A plurality of evaluations in accordance with the distance may be enabled. The touch position may be anywhere, and an evaluation method using only the touch time and the time that a touch should have been made may be adopted. In this case, as an example of a determination method when a request is made for a simultaneous touch operation of a plurality moving objects m, the detected number of touches may be sensed, a comparison being made of the sensed number with the number of moving objects m that were to be touched simultaneously, and a determination of a success in simultaneous touching being made if there is coincidence therebetween. If the number of sensed touches is fewer than the number of moving objects m that were to be touched simultaneously, a determination of a failure may be made. If the number of sensed touches is greater than the number of moving objects m that were to be touched simultaneously, a determination may be made as success or failure.

Second Embodiment

Figure 8:
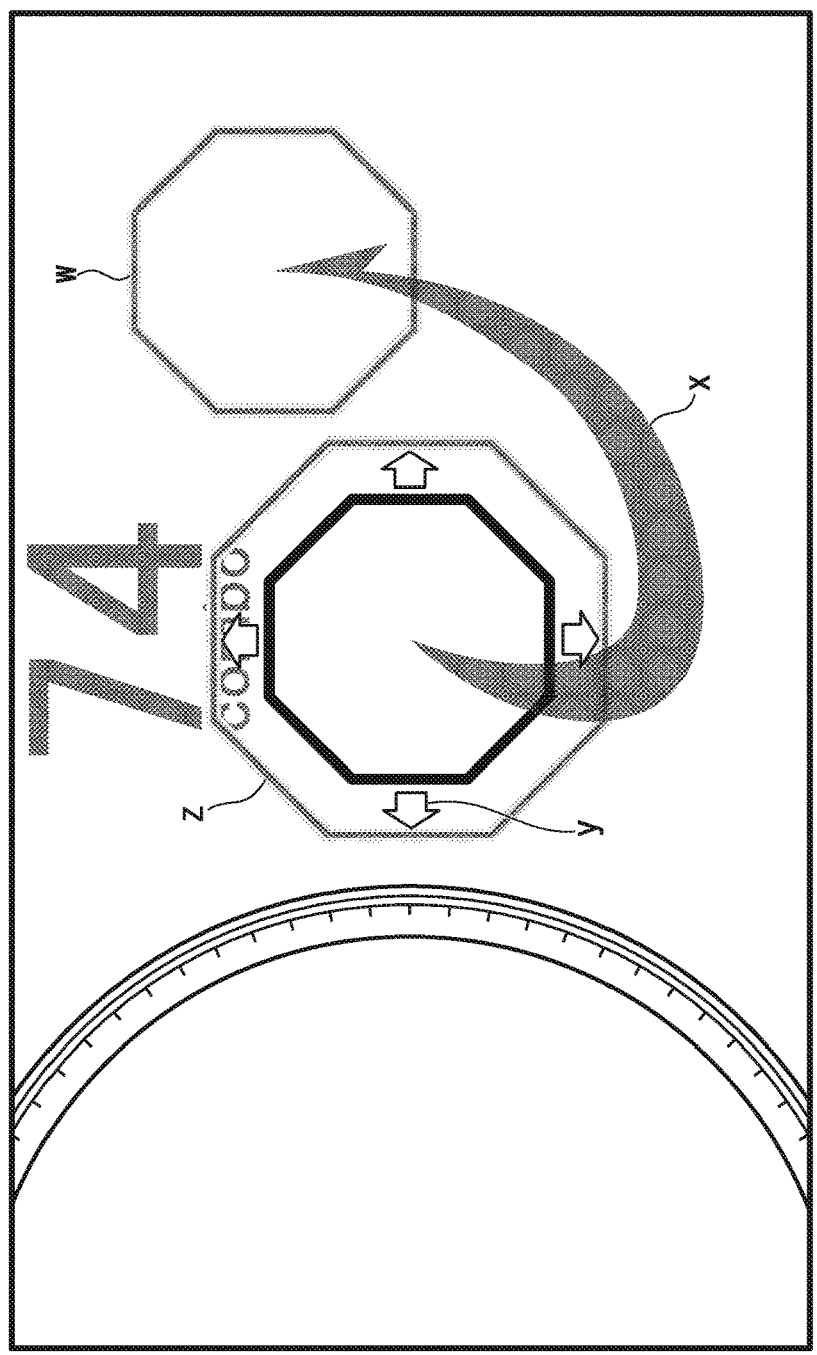
FIG. 8 is a drawing showing an example of a game screen according to a second embodiment of the present invention.

Next, the second embodiment of the present invention will be described. Because the game device 100 of the present embodiment has the same constitution as the game device 100 described in the first embodiment, the characteristic elements of the present embodiment will be described below. FIG. 8 shows an example of a game screen displayed on the screen of the touch panel 110 in the present embodiment. In the present embodiment, the timing of a control instruction operation to change the position of the constant reference indicator k by input from a user, such as described in the first embodiment, is added as a game element. That is, a change success/failure is determined based on the operation time received by the acceptor 133 as input of a control instruction to change the position of the constant reference indicator k and on the prescribed change time.

The output controller 132 of the present embodiment displays on the screen a change indicator that indicates the timing of changing the position of the constant reference indicator k. In this case, a movement position indicator w, which is a change indicator indicating the timing of moving the position of the constant reference indicator k, and a movement path indicator x, which indicates the path for moving the constant reference indicator k, are displayed. In the drawing, although the movement position indicator w is caused to be displayed as a shadow of the constant reference indicator k, the movement position indicator w and the movement path indicator x may be displayed, for example, as dotted lines. Only either one of the movement position indicator w and the movement path indicator x may be displayed, with the other not being displayed.

In the example in the drawing, an enlargement/reduction direction indicator y, which is a change indicator that indicates the direction of enlargement or reduction of the size of the constant reference indicator k, and an enlargement/reduction position indicator z, which is a change indicator that indicates the timing of the enlargement or reduction of the size of the constant reference indicator k, are displayed. The enlargement/reduction direction indicator y can be displayed as an outwardly directed arrow if the constant reference indicator k is to be enlarged, and as an inwardly direction arrow if the constant reference indicator k is to be reduced. The enlargement or reduction of the constant reference indicator k can have a prescribed number of a plurality of steps (for example, four steps) of size, enabling enlargement and reduction of the reference indicator in accordance with these steps. In this case, for example, control can be done so that enlargement is done on the first beat, and reduction is done on the next beat, so that if, for example, the reference indicator is to be made small, it does not become excessively small.

Figure 9:
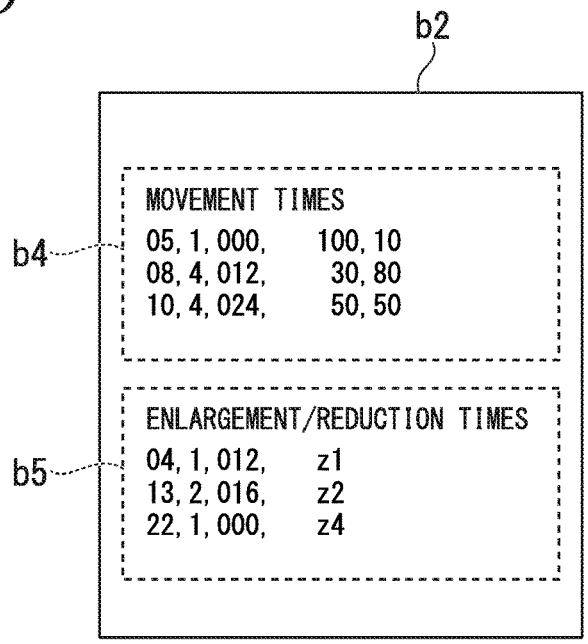
FIG. 9 is a drawing showing an example of the contents of sequence data according to the second embodiment of the present invention.

The operation sequence information b2 of the sequence data b stored in the sequence data storage 122 of the present embodiment, in addition to the moving object information b3 shown in the first embodiment, includes movement timing information b4 and enlargement/reduction timing information b5. FIG. 9 shows an example of the contents of the movement timing information b4 and the enlargement/reduction timing information b5. The movement timing information b4 includes, for each movement time for moving the constant reference indicator k during a melody, position information indicating the position of the constant reference indicator k at the movement destination to which it is caused to be move at that time. The movement timing information b4 is constituted as a set of a plurality of records, in which this information is associated with each other. In the example of the drawing, the information is coded, from the left, as the movement time and the position information, in that sequence.

The movement time is similar to the arrival time described in the moving object information, and indicates the time at which an operation for moving the constant reference indicator k should be made.

The position information is represented, for example, by X and Y coordinate values, with the lower-left corner of the rectangular screen taken as the origin. For example, the screen width is divided uniformly from top to bottom and left to right by a prescribed number, and numbers (unit length numbers) in the case in which numbers are sequential applied to each position from the bottom edge or the left edge corresponding to uniformly divided unit lengths (unit ranges) are used. In this example, 128 is used as the prescribed number. As the values indicating the X coordinate, numbers from 0, 1, 2, and so on in the horizontal direction up to 128 at the right edge position from the left edge up to the right edge are applied. In the same manner, as the values indicating the Y coordinate, numbers from 0, 1, 2, and so on in the vertical direction up to 128 at the top edge position from the bottom edge up to the top edge are applied. The values of the X coordinate and the Y coordinate are coded with commas as delineators. For example, the point at the lower-left corner of the screen is coded as "0, 0", and the point at the upper-right corner of the screen is coded as "128, 128". The position information, for example, indicates the position of the center of the constant reference indicator k.

The enlargement/reduction timing information b5 includes, for each enlargement/reduction time for enlarging or reducing the constant reference indicator k during a melody, size information indicating the size of the constant reference indicator k being enlarged or reduced at that time. The enlargement/reduction timing information b5 is constituted as a set of a plurality of records, in which this information is associated with each other. In the example of the drawing, the information is coded, from the left, as the enlargement/reduction time and the size information, in that sequence.

The enlargement/reduction time is similar to the movement time described in the movement timing information, and indicates the time at which an operation for enlarging or reducing the constant reference indicator k should be made.

The size information is information that identifies to what size an enlargement or reduction of the constant reference indicator k from among a prescribed plurality of enlargement or reduction sets to the constant reference indicator k (for example, four steps). For example, these are, in order of decreasing sizes, z1, z2, z3, and z4.

The output controller 132, for example, computes as the appearance time the time resulting from subtracting a prescribed amount of time from change time, which is the movement time or the enlargement/reduction time, and displays the change indicator on the screen at the computed appearance time. In this case, for example, with the approach to the change time from the time of displaying the change indicator at the appearance time, the color of the change indicator can be changed to indicate the timing. For example, the change may be made so that the color of the change indicator becomes fainter the closer is the change time, or the change indicator may be flashed quickly the closer is the change time. This enables the user to be guided in an easy-to-understand manner regarding the change time.

The determiner 134 performs a change success/failure determination based on the time of reception of input of a control instruction to change the position of the constant reference indicator k and on the timing indicated by the change indicator.

In making the change success/failure determination, the determiner 134 performs position determination processing and timing determination processing. For example, in the position determination processing, the determiner 134 compares the movement path and the movement position of the constant reference indicator k that has moved in response to a control instruction from the user with the movement path (movement path indicator x) and the movement position (movement position indicator w) indicated by the change indicator. The determiner 134 determines whether or not the movement path and the movement position of the constant reference indicator k that moved in response to the control instruction from the user and the movement path indicator x and movement position indicator w coincide. The determiner 134 determines a success if there is a coincidence and determines a failure if there is no coincidence. For example, the determiner 134 also compares the size of the constant reference indicator k enlarged or reduced in response to a control instruction from the user with the size indicated by the change indicator (enlargement/reduction position indicator z). The determiner 134 determines a success if the size of the constant reference indicator k enlarged or reduced in response to a control instruction from the user and the size indicated by the change indicator coincide and determines a failure if there is no coincidence.

If the determiner 134 determines a success in the position determination processing, it performs timing determination processing. For example, the determiner 134 determines a success if the time that an operation is made as input of a control instruction from the user and the change time coincide, and determines a failure if there is no coincidence. In this case, the determiner 134, similar to the determination of the operation time and the arrival time of the moving object, also determines different evaluations of the plurality of steps according to the difference between the operation time and the change time.

Figure 10:
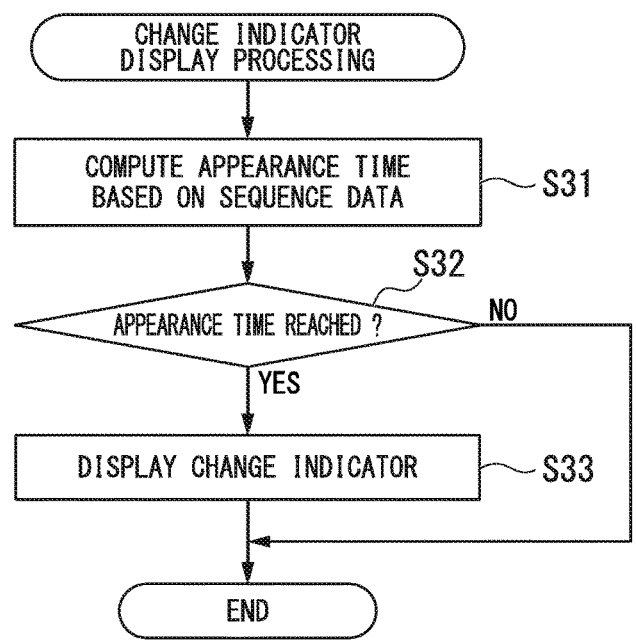
FIG. 10 is a flowchart showing an example of changed indicator display processing according to the second embodiment of the present invention.

Next, an example of the operation of the game device 100 according to the present embodiment will be described, with references made to the drawings. The overall processing flow is the same as the example of operation described with reference to FIG. 4 in the first embodiment. In this case, however, the output controller 132 performs change indictor display processing that displays the change indicator. In step S4 to step S8, change success/failure determination processing based on the operation time and the change time is performed. FIG. 10 is a flowchart showing an example of operation in the change indicator display processing.

The output controller 132 computes the appearance time of the change indicator based on the sequence data read out from the sequence data storage 122 (step S31). For example, the output controller 132 computes the appearance time resulting from subtracting a prescribed amount of time from the change time included in the sequence data.

The output controller 132 compares the computed appearance time with the time elapsed from the start of reproduction of the melody and ends processing if the appearance time is determined to have not arrived (NO at step S32). If the appearance time is determined to have arrived (YES at step S32), a change indicator is displayed at a position indicated by the position information and size information corresponding to that appearance time (step S33). When the change time has elapsed, the change indicator that was displayed at step S33 is deleted.

As described above, according to the present embodiment, in addition to being able to change the position of the constant reference indicator k by a control instruction from the user, the timing of changing the position is made a game element to determine a success or a failure, thereby enabling a new game enjoyment to be provided. There is a conventional game, for example, in which an operation item such as a virtual pad is displayed on the screen, and the virtual pad is moved in response to a control instruction from a user, and according to the present embodiment, a new game can be provided in which the moving of an operation item can itself be made a game element.

If, as has been shown in the first embodiment, control is performs so that one constant reference indicator k is reproduced into a plurality of constant reference indicators k in response to an operation from the user, a plurality of operation times of the plurality of control instructions from the user can be added as a game element in the same manner. In this case, for example, reproduction timing information indicating the timing of the reproduction of the constant reference indicator k during the melody may be included in the operation sequence information b2 of the sequence data b. The reproduction timing information, for example, can be made to include, for each reproduction time during the melody at which the constant reference indicator k will be reproduced, the number or constant reference indicators k to be reproduced at that time and position information indicating the destination positions to which the constant reference indicators k are to be moved.

In the change success/failure determination, a determination region having a prescribed width with respect to the movement path indicator x may be provided and if, in the operation of the user moving the constant reference indicator k, passage is made without going outside from within that determination region, the determiner 134 may determine that in the operation the movement path coincides, that is, the movement operation succeeded.

One or a plurality of determination points may be placed within the movement path indicator x and, in the operation of movement by the user, movement path coincidence may be determined by determining whether or not passage was done therethrough or through a prescribed range that includes the point or points. The determination points may be displayed in a form visible to the user, or may be provided in a form not visible to the user.

Also, a determination may be made of whether or not the final position (position after the change) of the constant reference indicator k is at the position to which it is to be moved (within a prescribed range that includes the movement position indicator w), without making a movement path determination.

Although in the above-described method the timing is determined after the determination of the path or position, the sequence between the path or position determination and the timing determination is not particularly restricted, and the path or position may be determined after the timing is determined. The path or position determination and the timing determination may be performed separately, with a final determination being made of the combined results of the determination. That is, a final success may be determined only when either path or the position determination succeeds and also the timing determination succeeds, with a failure in either or both resulting in a final determination of failure. In these determination methods, the method of performing the timing determination may be determination based only on the movement starting time, that is, the touch starting time. The determination may also be made based only on the movement ending time, that is, the touch ending time. The determination may be made based on both of these. In the same manner for the evaluation of an enlargement or a reduction operation regarding the size of the constant reference indicator k, the method of performing the timing determination may be determination based only on the enlargement/reduction operation starting time, only on the enlargement/reduction operation ending time, or based on both of these.

If a determination is to be made of whether or not the position after movement or the position after enlargement/reduction coincides with the position at which an operation should be made, the determination may be made, with one or a plurality of points of the constant reference indicator k as evaluation points, by determining whether or not the evaluation points are within a region including each of one or a plurality of points corresponding to the position at which movement, enlargement, or reduction is to be done. The determination may be made of whether or not, with the overall constant reference indicator k as the evaluation point, this is fit within a prescribed region that includes the position for movement.

If a determination is made as to whether or not the position after movement coincides with the position at which the operation should have been made, even if the constant reference indicator k has not reached the position to be reached at the arrival of the evaluation time, if it has reached a prescribed position in the midway of the path, points may be granted. That is, if the determination is made of passage of one or a plurality of determination points established within the movement path indicator x or of passage through a prescribed area that includes these determination points, points may be granted in accordance with the degree of passage.

If a determination is made as to whether or not the position after enlargement/reduction coincides with the position at which the operation should have been made, prescribed points may be granted, based on the size or dimensions of the constant reference indicator k at the arrival of the evaluation time.

The user may be requested to make both a movement operation and an enlargement or reduction operation simultaneously. Even if the touch is interrupted during a movement operation or an enlargement or reduction operation, the touch may be determined to be continuing if the interruption time is within a prescribed time period. The constant reference indicator k is optionally set at any position over the display screen. The position and the size of the constant reference indicator k stay fixed unless the position is displaced to another position and the constant reference indicator k is enlarged or reduced without changing the shape. In some cases, both the displacement of the position and the enlargement or reduction in size of the constant reference indicator k can be made simultaneously. After the constant reference indicator k with a certain size was once set at a position over the display screen, the constant reference indicator k can be displaced to a different position while enlarging or reducing the size of the constant reference indicator k. Displacement over the display screen of the constant reference indicator k with enlarging or reducing the size of the constant reference indicator k will in general change the distance between the constant reference indicator k and the movement object. The distance between the constant reference indicator k and the movement object may be defined between closest points on the peripheral edges of the constant reference indicator k and the movement object. In a case, it is possible that displacement with the size enlargement or reduction is made without changing the distance between the constant reference indicator k and the movement object. In other cases, both the displacement of the position and the enlargement or reduction in size of the constant reference indicator k can be made sequentially. In one case, the displacement is made before the enlargement or reduction is then made. In other case, the displacement is made after the enlargement or reduction is made. The shape of the constant reference indicator k is optional. Typical examples of the shape of the constant reference indicator k may be, but are not limited to, polygons, such as hexagon. The movement speed of the moving object is changed depending upon the change of the distance between the constant reference indicator k and the movement object so that it arrives at the constant reference indicator k at the prescribed arrival time. For example, if the distance from a moving object m to the constant reference indicator k is lengthened, the movement speed of the moving object m is increased so that it arrives at the constant reference indicator k at the prescribed arrival time. If, however, the distance from the moving object m to the constant reference indicator k is shortened, the movement speed of the moving object m is decreased so that it arrives at the constant reference indicator k at the prescribed arrival time.

Third Embodiment

Figure 11:
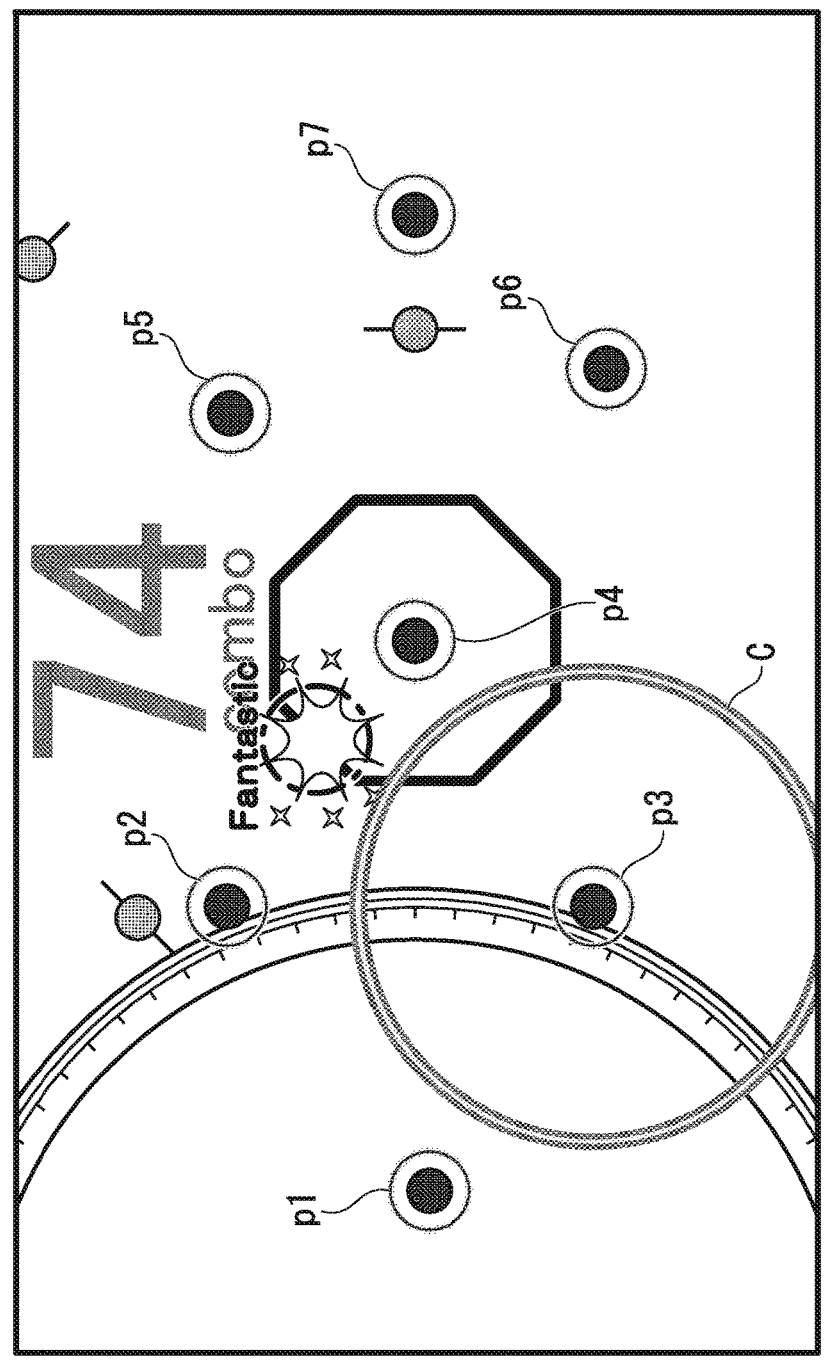
FIG. 11 is a drawing showing an example of a game screen according to a third embodiment of the present invention.

Next, the third embodiment of the present invention will be described. Because the game device 100 of the present embodiment has the same constitution as the game device 100 of the first embodiment and the second embodiment, the characteristic elements of the present embodiment will be described below. FIG. 11 shows an example of a game screen on the screen of the touch panel 110 in the present embodiment. In the present embodiment, as described in the first embodiment, in addition to the first success/failure determination, which is a success/failure determination based on the moving object m moving toward the constant reference indicator k that is continuously displayed on the screen during the game and the change success/failure determination based on the change indicator, a second success/failure determination is performed in accordance with a surrounding object c that is shrunk toward a temporary reference indicator p, which is a reference indicator that is temporarily displayed from the appearance time until the arrival time.

The game device 100 displays a temporary reference indicator p at a prescribed position on the screen, displays a surrounding object c around that temporary reference indicator p, and shrinks the surrounding object toward the temporary reference indicator. The game device 100 then receives input of a prescribed operation from a user and makes a second success/failure determination, based on the operation timing of receiving the input and the arrival time of the surrounding object c that shrinks toward the temporary reference indicator p arriving at the temporary reference indicator p.

In the example in the drawing, a temporary reference indicator p4 is displayed at the center position of a landscape format screen and displays the temporary reference indicator p1, the temporary reference indicator p2, the temporary reference indicator p3, the temporary reference indicator p5, the temporary reference indicator p6, and the temporary reference indicator p7 at six positions in the surrounding areas. The temporary reference indicators displayed in this manner at seven locations, rather than being displayed from the beginning, can be displayed from an appearance time that is a prescribed time before the arrival time at which a user should make an operation during the melody and then removed after the arrival time has passed.

Figure 12:
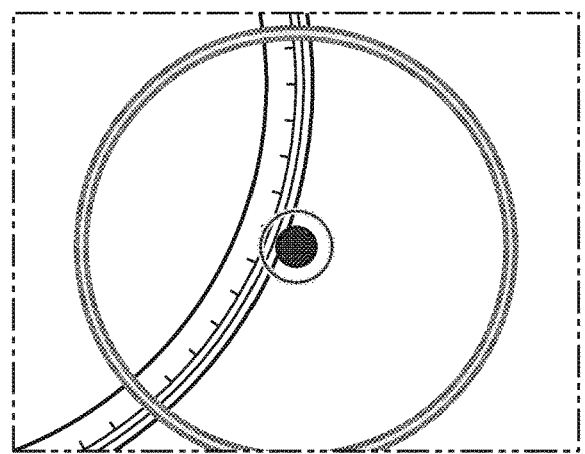
FIG. 12 is a first drawing showing the shrinking of a surrounding object toward the reference indicator according to the third embodiment of the present invention.
Figure 13:
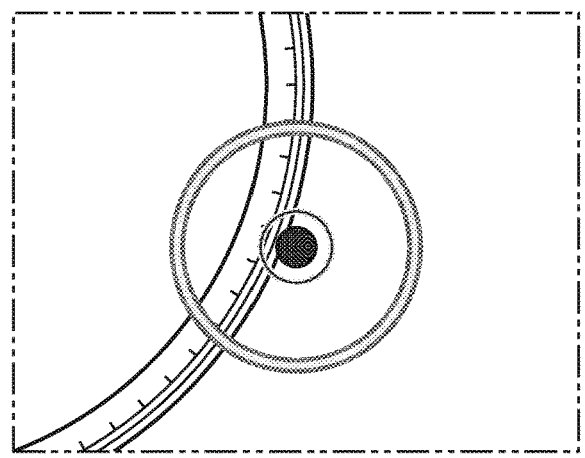
FIG. 13 is a second drawing showing the shrinking of a surrounding object toward the reference indicator according to the third embodiment of the present invention.
Figure 14:
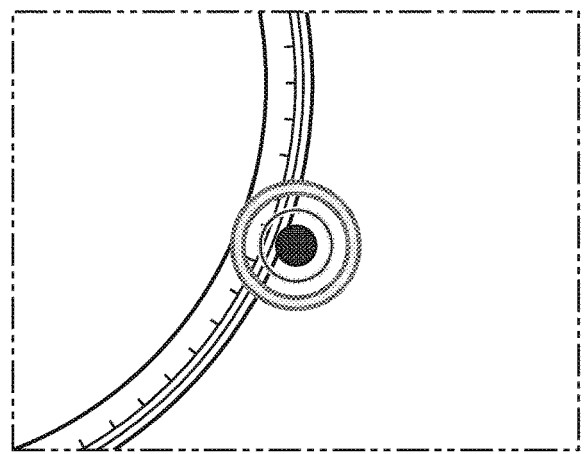
FIG. 14 is a third drawing showing the shrinking of a surrounding object toward the reference indicator according to the third embodiment of the present invention.

The game device 100 displays from an appearance time that is a prescribed time before the arrival time the surrounding object c around such a temporary reference indicator p (for example, the temporary reference indicator p3), causes the surrounding object c to shrink toward the temporary reference indicator p3, and removes the surrounding object c upon arriving at the temporary reference indicator p3. FIG. 12, FIG. 13, and FIG. 14 show the shrinking of the surrounding object shown in FIG. 11 toward the temporary reference indicator. In this case, an example in which the surrounding object c is circular is shown. The appearance time of the surrounding object c may be the same as the appearance time of the temporary reference indicator, or may be different. The surrounding object c may accelerate gradually as it shrinks toward the temporary reference indicator p3, or may shrink with a constant speed.

If this is done, the game device 100 can provide a guide to the time that the user should make an input of a prescribed operation, by the timing of the shrinking surrounding object c reaching the temporary reference indicator p3. This enables a new presentation and effect for notifying the user when an operation should be made, thereby enabling a heightening of the game enjoyment.

The constitution of a game device 100 that provides such a game is described in detail below.

Figure 15:
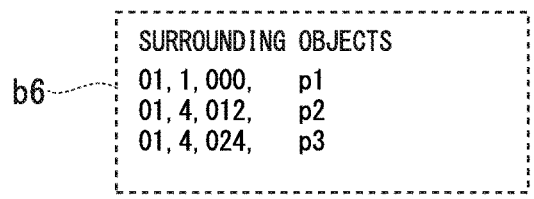
FIG. 15 is a drawing showing an example of the contents of sequence data according to the third embodiment of the present invention.

The operation sequence information b2 of the sequence data b stored in the sequence data storage 122 in the present embodiment includes surrounding object information b6. FIG. 15 shows an example of the contents of the surrounding object information b6. The surrounding object information b6 includes, for each surrounding object to be caused to appear during a melody, the times of the surrounding object arriving at the temporary reference indicator and reference indicator identification information identifying the temporary reference indicator. The surrounding object information b6 is constituted by a set of a plurality of records, in which this information is associated with each other. In the example of the drawing, the information is coded, from the left, as the arrival time and the temporary reference indicator identification information, in that sequence.

The arrival time is the same as the arrival time described regarding the moving object information.

The temporary reference indicator identification information identifies, of the temporary reference indicators to be displayed at a plurality of positions on the screen, a temporary reference indicator that a surrounding object is caused to reach at the corresponding arrival time.

For example, the seven temporary reference indicators are identified by information such p1, p2, p3, p4, p5, p6, and p7. In this example, the temporary reference indicator identification information p1, p2, p3, p4, p5, p6, and p7 correspond to the reference symbols of the temporary reference indicators shown in FIG. 11, for each of which information indicating prescribed positions of the temporary reference identification has been stored beforehand. The prescribed position of a temporary reference indicator can be represented, for example, by the coordinate values of the X coordinate and the Y coordinate, referenced to the point at the lower-left corner of the rectangular screen. The output controller 132 references such temporary reference indicator identification information and information indicating the prescribed position corresponding thereto to display the temporary reference indicator p at the prescribed position.

The output controller 132 in the present embodiment displays the constant reference indicator k, which is a reference indicator that is displayed on the screen continuously during a game, and a temporary reference indicator p, which is displayed on the screen temporarily during the game, and causes the surrounding object c surrounding the temporary reference indicator p on the screen to be displayed and to shrink toward the temporary reference indicator p.

The determiner 134 makes the first success/failure determination, based on the time at which the acceptor 133 receives input and on the time at which the moving object m moving toward the constant reference indicator k reaches the constant reference indicator k, and makes the second success/failure determination, based on the time that the acceptor 133 receives an input and on the time at which the surrounding object c shrinking toward the temporary reference indicator p reaches the temporary reference indicator p.

In the second success/failure determination, the determiner 134 performs position determination processing, based on the operation position at which a touch operation was made, and timing determination processing, based on the operation time at which a touch operation was made. For example, the determiner 134 performs position determination processing in accordance with the positional relationship between the operation position at which the touch operation was made, the position of the reference indication and the position of the surrounding object at that time.

If a success is determined in the position determination processing, the determiner 134 performs timing determination processing that determines a success if the operation time and the arrival time are within a prescribed range, and determines a failure if they are not within the prescribed range. In this case, the determiner 134 can make determination of evaluation of steps, in accordance with the difference between the operation time and the arrival time.

In this manner, the game device 100 of the present embodiment, in addition to performing the first success/failure determination based on a touch operation made at the arrival time of a moving object m moving on a line of the constant reference indicator k, performs the second success/failure determination by the temporary reference indicator p and the surrounding object c. In this manner, displaying a plurality of reference indicators and objects that guide a plurality of touch operations enables the provision of a timing game with diverse representations, enabling a heightening of the game enjoyment.

In this case, the output controller 132 can cause the shrinking of a surrounding object c toward the temporary reference indicator p at a speed that is different from the speed at which a moving object m moves toward the constant reference indicator k. For example, the surrounding object c can be caused to shrink toward the temporary reference indicator p at a speed that is faster than the speed of movement of a moving object m toward the constant reference indicator k. This clarifies the moving object m and the surrounding object c as being different types of objects, thereby broadening the scope of the game and facilitating distinction by the user of the difference between a moving object m and a surrounding object c, both intuitively and visually.

The output controller 132 may display a moving object m and a surrounding object c with different colors. For example, it can display a red moving object m and a green surrounding object c. This clarifies the moving object m and the surrounding object c as being different types of objects, thereby broadening the scope of the game and facilitating distinction by the user of the difference between a moving object m and a surrounding object c, both intuitively and visually. In this case, for example, the temporary reference indicator p may also be displayed in green to match the surrounding object c.

The output controller 132 can display a temporary reference indicator p at a position that is different from the position at which the constant reference indicator k is displayed on the screen. That is, although the constant reference indicator k and a temporary reference indicator p may be displayed at arbitrary positions on the screen, they are difficult for the user to see if they are displayed at the same position, and it can be imagined that there are cases in which it is difficult to make a touch operation to match the arrival time. Given this, by performing control so that the constant reference indicator k and the temporary reference indicator p are displayed at different positions, it is possible to for the user to enjoy playing the game.

Next, an example of operation of the game device 100 according to the present embodiment will be described, with references being made to the drawings.

The overall processing flow is the same as the example of operation described with reference to FIG. 4 in the first embodiment. In this case, however, in step S4 to step S8, a first success/failure determination based on the constant reference indicator k and the moving object m and a second success/failure determination based on the temporary reference indicator p and the surrounding object c are performed.

Figure 16:
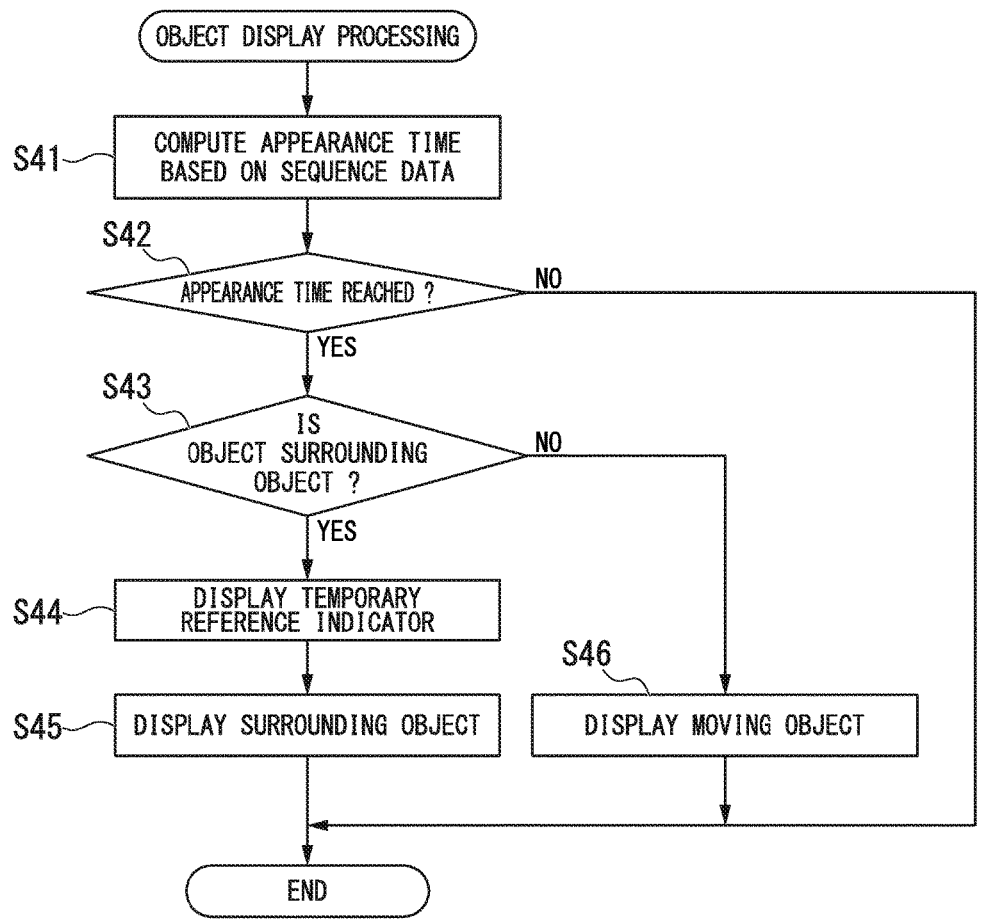
FIG. 16 is a flowchart showing an example of operation of a game device according to the third embodiment of the present invention.

FIG. 16 is a flowchart showing an example of the operation in the object display processing in the present embodiment.

When the reproduction of the melody starts, the output controller 132 starts keeping time, referenced to the time at which the melody reproduction starts and computes the appearance time of the moving object m and the appearance time of the temporary reference indicator p and the surrounding object c, based on the sequence data read out from the sequence data storage 122 (step S41). For example, the output controller 132 computes the appearance time by subtracting a prescribed amount of time from the arrival time included in the sequence data.

The output controller 132 compares the computed appearance time with the elapsed time from the time of the start of melody reproduction and ends processing if it determines that the appearance time has not arrived (NO at step S42). If the determination is that the appearance time has arrived (YES at step S42), a determination is made of whether the object for which the arrival time has been reached is a surrounding object or a moving object. If the output controller 132 determines that the object for which the arrival time has been reached is not a surrounding object (that is, if it is a moving object) (NO at step S43), a moving object m is displayed on the path indicated by the path identification information corresponding to that appearance time, and is moved so as to reach the constant reference indicator k at the appearance time (step S46).

At step S43, if a determination is made that the object for which the appearance time has been reached is a surrounding object (YES at step S43), a temporary reference indicator p indicated by the reference indicator identification information corresponding to that arrival time is displayed on the screen (step S44). The output controller 132 displays on the screen a surrounding object c that surrounds that temporary reference indicator p, and causes the surrounding object c to shrink so as to reach the temporary reference indicator p at the arrival time (step S45). When the arrival time has passed, the output controller 132 deletes the display of the temporary reference indicator p that had been displayed at step S44 and the surrounding object c that had been displayed at step S45.

As described above, according to the present embodiment, both a moving object m moving toward the constant reference indicator k and a surrounding object c shrinking toward a temporary reference indicator p are used to provide a guide to the arrival times of each, and a success/failure determination is made by a touch operation in response to these arrival times. This enables the provision of a new presentation of showing the arrival timing of a plurality of objects, thereby enabling provision of game enjoyment.

Although in the above-described example a temporary reference indicator has been caused to be displayed with a timing and at a position set in the sequence data, display may be made in positions randomly established by a computer program from among the seven prescribed positions on the screen. Also, although the example in which the temporary reference indicators are displayed at seven prescribed positions on the screen has been shown, the positions for display of and number of temporary reference indicators may be arbitrary positions and an arbitrary number. For example, the positions and number made be randomly established by a computer program, may be established in accordance with the size of the screen area of the game device 100 used to play the game, the game presentation, the melody, or the game difficulty level or the like, or may be set by the user.

Although the above-described example is one in which the surrounding object is circular, the surrounding object c may be another shape, as long as it surrounds the temporary reference indicator p and as long as it overall shrinks toward the temporary reference indicator p. For example, the surrounding object c may be polygonal, such as a triangle shape or square shape. The surrounding object c may be lines such as shown in the above-described example (solid lines) or may be dotted lines. Alternatively, for example, it may be a plurality of objects arranged so as to surround the temporary reference indicator p and move simultaneously toward the temporary reference indicator p, the surrounding object c overall shrinking toward the temporary reference indicator p.

In a game such as this, if the game device 100 has a plurality of displays 101, the plurality of displays 101 can be used to provide a new presentation. For example, there is an arcade game machine or a portable game machine or the like having a screen with two displays 101, arranged at the top and bottom. For example, a game device 100 that is an arcade game has a lower-side screen that is the touch panel 110 (hereinafter referred to as the lower screen) and an upper-side screen that is not a touch panel (hereinafter referred to as the upper screen). In the normal condition, a game device 100 such as this displays a game screen such as described above on the lower screen, which is the touch panel 110, which is played by a user, and the upper screen can be used for presentations and for appeal to surrounding spectators, displaying an image that is the same as the background image of the lower screen or a different image.

Figure 17:
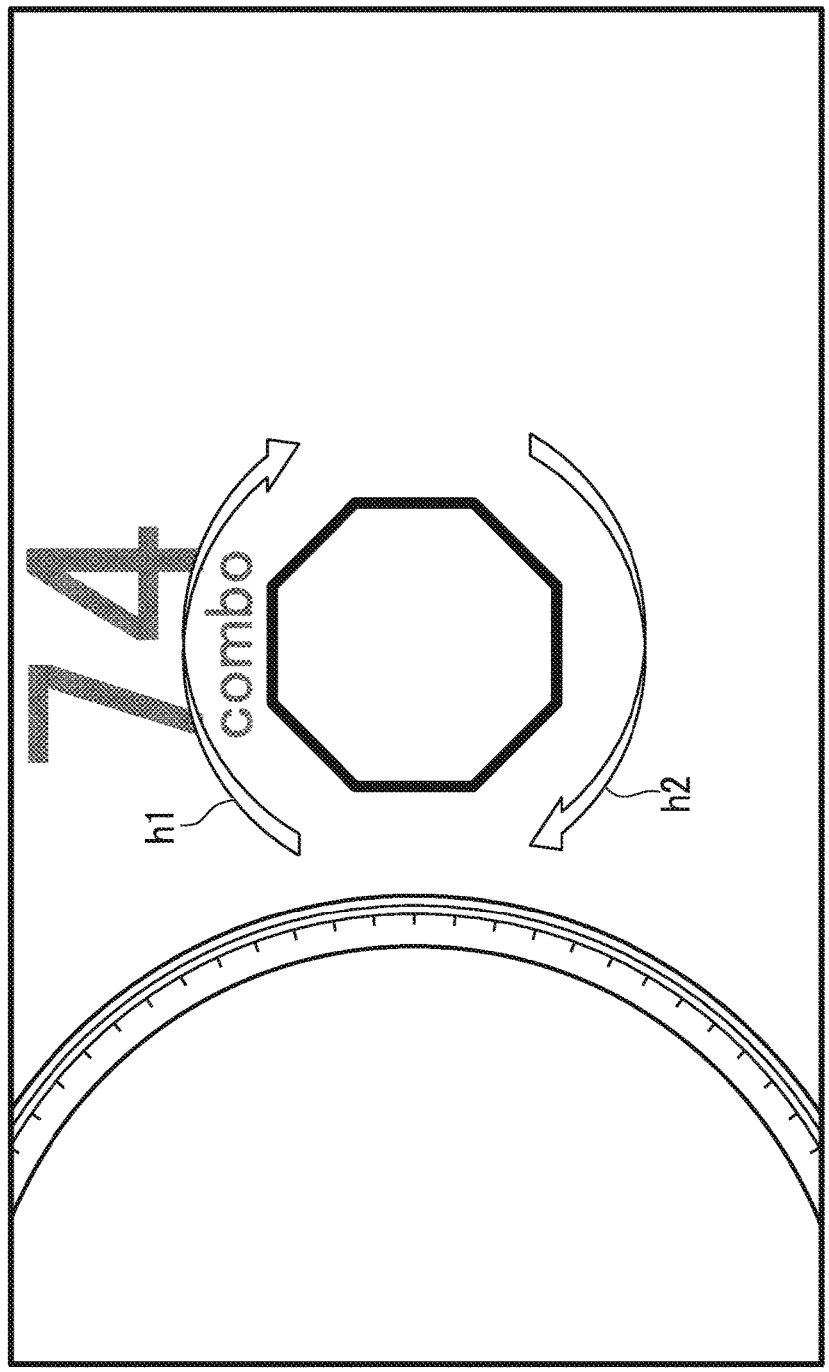
FIG. 17 is a drawing showing an example of a game screen for displaying an operation indicator according to the third embodiment of the present invention.

A game device 100 such as this displays an operation indicator that causes a prescribed operation in the area around the constant reference indicator k on the lower screen, with a prescribed timing. For example, FIG. 17 shows an example of the game screen that displays such an operation indicator in the area around the constant reference indicator k on the lower screen. In this case, two operation indicators, operation indicator h1 and operation indicator h2, are displayed. If a touch operation (slide operation) is done so as to trace in the direction indicated by each of the operation indicators with a prescribed timing, the game device 100 goes into a special state. In the special state, the game device 100 displays on the upper screen the image that had been displayed up until then on the lower screen.

In the special state, the constant reference indicator k is displayed, and a temporary reference indicator p is temporarily displayed on the upper screen with a prescribed timing. During the special state, surrounding objects c only may be displayed on the upper screen, without displayed the moving objects m. Also, during the special state, temporary reference indicators p are continuously displayed at all positions on the lower screen established for display of temporary reference indicators p, and these are caused to function as the input 102 for playing the game. During this state, the user performs touch operations with respect to the temporary reference indicators p displayed on the lower screen, while watching the temporary reference indicators p and the surrounding objects c display temporarily on the upper screen. With a prescribed timing, the game device 100 returns the special state to the normal state.

This not only makes a presentation making effective use of the two displays 101, but also provides a game with a new enjoyment.

Although in this case the example in the drawing shows the display of two operation indicators, operation indicator h1 and operation indictor h2, one or three or more operation indicators may be displayed.

Although the above-described example, the example described is that in which, if a touch operation is made so as to trace an operation indicator, the image of the lower screen is displayed on the upper screen, the special state control that displays the lower screen image on the upper screen can be started regardless of whether or not the operation of tracing the operation indicator is made with the prescribed timing. Also, although the above-described example is that in which operation indicators describing arcs are disposed in the area around the constant reference indicator k, this is not a restriction, and, for example, an arrow image directed upwardly to guide the constant reference indicator k displayed on the lower screen to the upper screen may be disposed as an operation indicator. Thus, any form may be used, as long as it is an indicator that predicts the transition to the special state. Also, although in the above-described example the return is made from the special state to the normal state with a prescribed timing, an operation item so as to predict the transition from the special state to the normal state may be disposed on the upper screen or lower screen with a prescribed timing and, in response to an operation thereof, or at a prescribed timing even if the operation fails, the transition may be made from the special state to the normal state.

The game device 100 of the first embodiment to the third embodiment as described above can be embodied by a computer operated by the user, by a server device communicating with a terminal operated by the user, or as a game system, which is the combination of a terminal operated by the user and a server device or the like communicating with the terminal. Embodiment is also possible as a non-portable game machine such as consumer game machine or a home-use game machine, a game machine that is a portable information terminal referred to as a portable game machine, or a game machine referred to as an arcade game machine or commercial game machine. Embodiment is possible as a game method by these game systems and game machines, and embodiment is possible as a game program causing operation of computer of these game systems and game machines. The game program may be built into the game system or game machine beforehand, or may be installed into the game system or game machine after distribution together with an installer.

Figure 18:
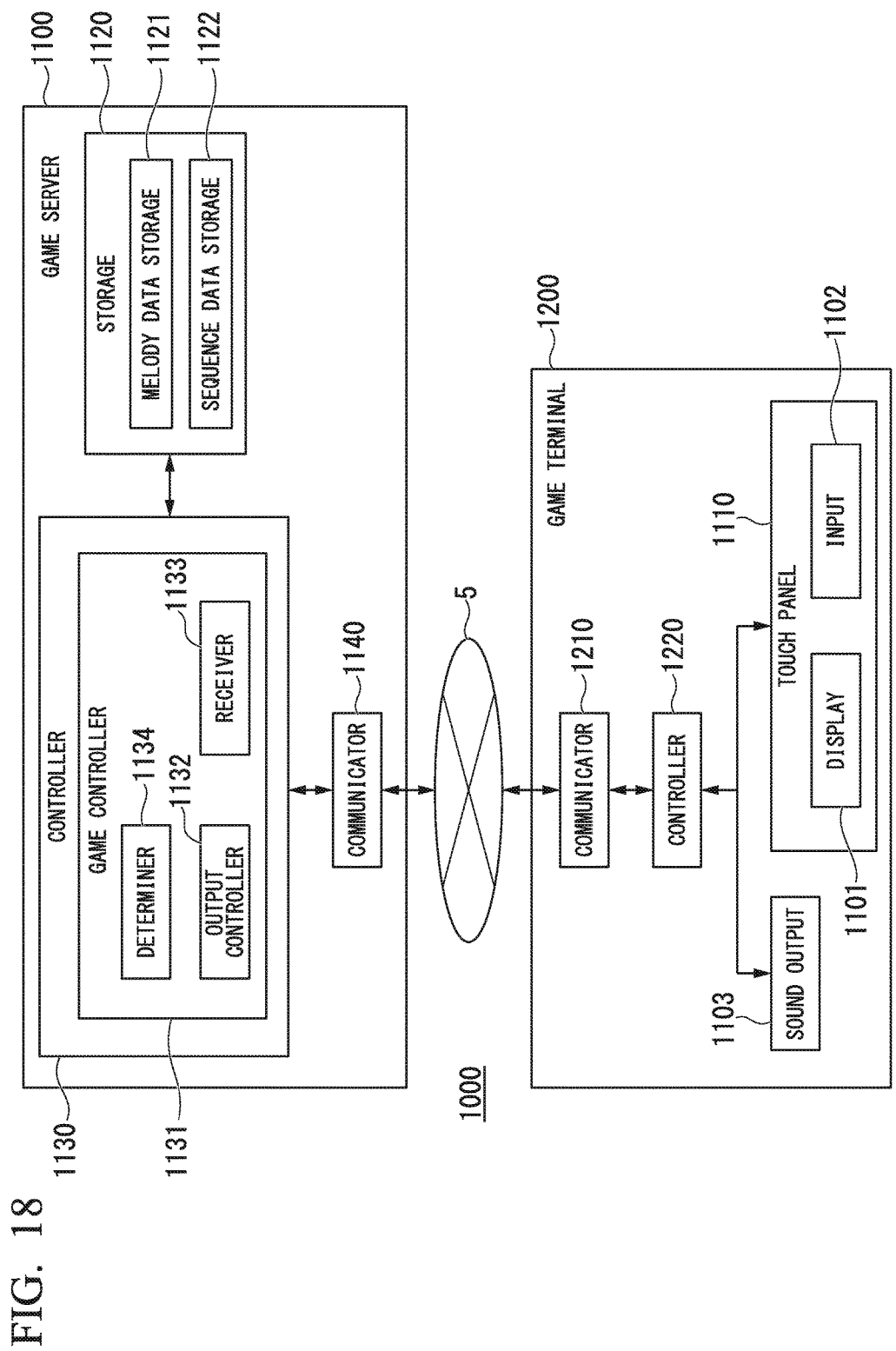
FIG. 18 is a block diagram showing an example of the constitution of a game system according to another embodiment of the present invention.

FIG. 18 is a block diagram showing an example of the constitution of a game system 1000 according to another embodiment of the present invention, which shows an example of a game system 1000 that is the combination of a game terminal 1200 operated by the user and game server 1100 that communicates with the game terminal 1200. The game system 1000 is a computer system that provides a game that is a so-called cloud game.

The game server 1100 and the game terminal 1200 are connected via a network 5. The network 5 includes an information communication network constituted by, for example, the Internet, a WAN (wide area network), a LAN (local area network), a dedicated line, or a combination thereof.

The game server 1100 has a storage 1120, a controller 1130, and a communicator 1140. The storage 1120 has a melody storage 1121 and a sequence data storage 1122. The controller 1130 has a game controller 1131, and the game controller 1131 has an output controller 1132, an acceptor 1133, and a determiner 1134.

The storage 1120, the melody data storage 1121, and the sequence data storage 1122 are the same as the storage 120, the melody data storage 121, and the sequence data storage 122 in the above-described embodiments. The controller 1130, the game controller 1131, the output controller 1132, the acceptor 1133, and the determiner 1134 are the same as the controller 130, the game controller 131, the output controller 132, the acceptor 133, and the determiner 134 in the above-described embodiments.

The communicator 1140 communicates with the game terminal 1200 via the network 5. For example, the communicator 1140 transmits to the game terminal 1200 and displays thereon information of a screen generated by the output controller 1132. Also, the communicator 1140 transmits to the game terminal 1200 and outputs melody data output from the output controller 1132. The communicator 1140 also receives a signal indicating a user operation input to the game terminal 1200 and inputs it to the acceptor 1133.

The game terminal 1200 has a touch panel 1110 that has a display 1101 and an input 1102, a sound output 1103, a communicator 1210, and a controller 1220.

The display 1101, the input 1102, the touch panel 1110, and the sound output 1103 are the same as the display 101 the input 102, the touch panel 1110, and the sound output 1103 of the first embodiment.

The communicator 1210 communicates with the game server 1100 via the network 5. For example, the communicator 1210 receives game screens and melody data transmitted from the game server 1100. The communicator 1210 also transmits to the game server 1100 a signal indicating user operations input to the input 1102.

The controller 1220 controls the various parts of the game terminal 1200. For example, the controller 1220, based on information received by the communicator 1210 from the game server 1100, displays a game screen on the display 1101 and causes the sound output 1103 to reproduce a melody. The controller 1220 also transmits to the game server 1100, via the communicator 1210, a signal indicating a user operation input to the input 1102.

In this case, although the game server 1100 is shown as the example in which it has a melody data storage 1121, when a game is played, the melody data selected for playing can be downloaded to the game terminal 1200 beforehand, before the start of the game. In this case, with regard to display control of the reference indicators and objects, a screen that is generated and transmitted in real time by the output controller 1132 of the game server 1100 after the start of the game, as the game terminal 1200 reproduces melody data that was downloaded before the start of the game and stored in its own storage.

In this manner, the various functional parts of the game device 100 and the game system 1000 can be distributed among or integrated into an arbitrary number of computers, in accordance with whether the environment is a cloud environment or a network environment, the number of users, and the number and specifications of hardware provided for constituting the game system.

In the above-described examples, after the time of display of objects such as the moving object and the surrounding objects at appearance times and during the time an object is moving toward the reference indicators, such as the constant reference indicator or a temporary reference indicator, the color of the objects or reference indicators may be changed. For example, the closer an object approaches to the reference indicator the color can be made denser, or may be made to flash. This more greatly facilitates the understanding by the user of the arrival time.

Although in the foregoing examples, the examples shown have been ones in which the output controller 132 shrinks a surrounding object toward the reference indicator at a speed that is faster than the speed of movement of a moving object toward the constant reference indicator, the reverse may be done. That is, the output controller 132 may move a moving object toward the constant reference indicator at a speed that is faster than the speed with which a surrounding object shrinks toward the reference indicator.

Also, although the foregoing described examples have been ones in which, in the success/failure determination, the determiner 134 performs position determination processing and timing determination processing, success or failure may be determined by performing only timing determination processing, without performing position determination measures. That is, a determination of a success may be made if the time coincides, regardless of where the touch operation was made on the touch panel 110. If this is done, for example, it is possible to enjoy the game freely even in the case of a user not accustomed to game operations using a touch panel 110. Alternatively, a success/failure determination can be made by receiving input of an operation by pressing a physical button of a game device 100 that does not have a touch panel, based on the time at which the button is pressed and on the arrival time.

Alternatively, for example, with a game device 100 having a plurality of physical buttons corresponding to a plurality of sides of the constant reference indicator k or to each temporary reference indicator p, reception can be made of input of an operation by pressing the corresponding buttons.

Although the above-described examples have been described for moving objects m and surrounding objects c that require the user to make a touch operation one time, these may be objects that require, for example, a long press at the arrival time, objects that require burst pressing, or objects requiring a flick operation or the like.

Also, although the above-noted examples were shown for the case of including the arrival times in the sequence data stored in the sequence data storage 122 beforehand and identifying the appearance time by subtracting a prescribed time from the arrival time, other information may be included in the sequence data, as long as it identifies the arrival times and appearance times. For example, the appearance times can be included in place of the arrival times, and the output controller 132 can identify the arrival times by adding a prescribed time to the appearance times. Alternatively, for example, a prescribed time that is the screen dwell time during which an object exists on the screen, between the appearance time and the arrival time, can be included in the sequence data and this value use in performing computation processing. Alternatively, both the appearance times and the arrival times can be included in the sequence data and the appearance times and arrival times can be identified by reading them out, without the output controller 132 performing computation processing.

In the above-described embodiments, the example in which, based on the determination result in the timing determination processing, an evaluation of a plurality of steps, such as "Fantastic" and "Great" is made, an evaluation of a plurality of steps can be made based on the determination result in the position determination processing. For example, control can be done so that the operation position being within a prescribed range with respect to the reference indicator is "Fantastic," and the operation position moves more distance from the reference indicator, the evaluations are reduced to "Great" and then "Good". Alternatively, an evaluation may be made with in plurality of steps, based on the determination results of both the timing determination processing and the position determination processing.

In the above-described examples, when a video is to be reproduced as the background to a reference indicator or object, with two displays 101, transmission-type liquid crystal may be used for the first display close to the user that displays reference indicators and objects, with the second, rear display reproducing a video. In this case, for example, to avoid the display of reference indicators and objects displayed on the first display being difficult to see because of the video being displayed on the second display, the display may be made dynamically in white on a dark background, at positions corresponding to the reference indicators and objects in the video display on the second display.

Although the above-described examples have been shown as the example of having a game controller 131 and in which a game program for executing a game is stored in the storage 120 beforehand, a game program may be, for example, received via a network, installed, and stored in the storage 120, and a game program stored in a removable storage medium may be read out, installed, and stored in the storage 120.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A game program product, comprising:
a non-transitory computer-readable medium, and a computer program stored in the non-transitory computer-readable medium, the computer program being, when executed by a computer of a game system, configured to cause the computer to at least:
display at least: 1) a reference indicator at a position over a display screen; and 2) a moving object which moves toward the reference indicator on the display screen;
change the position of the reference indicator displayed over the display screen;
receive an input of a user's operation; and
determine success or failure of the user's operation, based at least in part on: a timing of receiving the input of the user's operation, and a timing that the moving object reaches the reference indicator,
wherein the reference indicator is associated with a plurality of paths on which the moving object is movable over the display screen,
wherein the plurality of paths extend straight from positions on the display screen to the reference indicator, the plurality of paths include at least two paths which are not parallel to each other,
wherein the plurality of paths extend from different positions on edges of the display screen to the reference indicator, the plurality of paths include at least two paths which are not parallel to each other,
wherein the moving object is displayed to move on an identified path of the plurality of paths from a first position, among the different positions on the edges of the display screen, to the reference indicator, where the identified path is identified by a path identification information,
wherein the path identification information identifies the identified path on which the moving object reaches the reference indicator at a prescribed arrival time, and
wherein the computer program is, when executed by the computer of the game system, configured to cause the computer to further at least:
display, on the display screen, 3) a change indicator, which indicates as a user's operation guide, the timing of a user's operation for changing the position of an outside edge of the reference indicator, by changing a size of the reference indicator or by moving a position of the reference indicator, with reference to the change indicator displayed on the display screen;
change, in accordance with the input, the position of the outside edge of the reference indicator over the display screen; and
perform a change success failure determination based on the timing that the input is received and on the timing indicated by the change indicator.

2. The game program product according to claim 1, wherein the computer program is, when executed by the computer, configured to cause the computer to:
further receive an input of user's instructions for changing the position of the reference indicator over the display screen, and
wherein changing the position of the reference indicator comprises changing the position of the reference indicator in accordance with the user's instructions.

3. The game program product according to claim 2, wherein the computer program is, when executed by the computer, configured to cause the computer to further:
display a change indicator that indicates a timing of changing the position of the reference indicator, and
determine success or failure of the change in position of the reference indicator, based at least in part on: a timing of receiving the input of user's instructions for changing the position of the reference indicator and the timing of changing the position of the reference indicator, which is indicated by the change indicator.

4. The game program product according to claim 3, wherein the computer program is, when executed by the computer, configured to cause the computer to further:
change a movement speed of the object which is moving toward the reference indicator upon changing the position of the reference indicator.

5. The game program product according to claim 3, wherein the computer program is, when executed by the computer, configured to cause the computer to further:
display a plurality of moving objects which move toward the reference indicator in different directions from an outside area surrounding the reference indicator;
changing a size of the reference indicator for changing positions of an outside edge of the reference indicator.

6. The game program product according to claim 3, wherein the computer program is, when executed by the computer, configured to cause the computer to further:
move the reference indicator over the display screen for changing positions of an outside edge of the reference indicator.

7. The game program product according to claim 3, wherein the computer program is, when executed by the computer, configured to cause the computer to further:
display, on the display screen, the reference indicator as a constant reference indicator continuously during a game time period and a temporary reference indicator temporarily in the game time period;
display, on the display screen, a surrounding object which surrounds the temporary reference indicator;
make the surrounding object shrink toward the temporary reference indicator;
make a first success failure determination, based at least in part on: the timing of receiving the input of the user's operation, and a timing that the moving object moving toward the constant reference indicator reaches the constant reference indicator; and
make a second success failure determination, based at least in part on: the timing of receiving the input of the user's operation, and a timing that the moving object shrinking toward the temporary reference indicator reaches the temporary reference indicator.

8. The game program product according to claim 2,
wherein the computer program is, when executed by the computer, configured to cause the computer to further:
change a movement speed of the object which is moving toward the reference indicator upon changing the position of the reference indicator.

9. The game program product according to claim 8,
wherein the computer program is, when executed by the computer, configured to cause the computer to further:
move the reference indicator over the display screen for changing positions of an outside edge of the reference indicator.

10. The game program product according to claim 2,
wherein the computer program is, when executed by the computer, configured to cause the computer to further:
display a plurality of moving objects which move toward the reference indicator in different directions from an outside area surrounding the reference indicator;
changing a size of the reference indicator for changing positions of an outside edge of the reference indicator.

11. The game program product according to claim 2,
wherein the computer program is, when executed by the computer, configured to cause the computer to further:
move the reference indicator over the display screen for changing positions of an outside edge of the reference indicator.

12. The game program product according to claim 1,
wherein the computer program is, when executed by the computer, configured to cause the computer to further:
change a movement speed of the object which is moving toward the reference indicator upon changing the position of the reference indicator.

13. The game program product according to claim 12,
wherein the computer program is, when executed by the computer, configured to cause the computer to further:
display a plurality of moving objects which move toward the reference indicator in different directions from an outside area surrounding the reference indicator;
changing a size of the reference indicator for changing positions of an outside edge of the reference indicator.

14. The game program product according to claim 12,
wherein the computer program is, when executed by the computer, configured to cause the computer to further:
move the reference indicator over the display screen for changing positions of an outside edge of the reference indicator.

15. The game program product according to claim 12,
wherein the computer program is, when executed by the computer, configured to cause the computer to further:
display, on the display screen, the reference indicator as a constant reference indicator continuously during a game time period and a temporary reference indicator temporarily in the game time period;
display, on the display screen, a surrounding object which surrounds the temporary reference indicator;
make the surrounding object shrink toward the temporary reference indicator;
make a first success failure determination, based at least in part on: the timing of receiving the input of the user's operation, and a timing that the moving object moving toward the constant reference indicator reaches the constant reference indicator; and
make a second success failure determination, based at least in part on: the timing of receiving the input of the user's operation, and a timing that the moving object shrinking toward the temporary reference indicator reaches the temporary reference indicator.

16. The game program product according to claim 1,
wherein the computer program is, when executed by the computer, configured to cause the computer to further:
display a plurality of moving objects which move toward the reference indicator in different directions from an outside area surrounding the reference indicator; and
changing a size of the reference indicator for changing positions of an outside edge of the reference indicator.

17. The game program product according to claim 1,
wherein the computer program is, when executed by the computer, configured to cause the computer to further:
move the reference indicator over the display screen for changing positions of an outside edge of the reference indicator.

18. The game program product according to claim 1,
wherein the computer program is, when executed by the computer, configured to cause the computer to further:
display, on the display screen, the reference indicator as a constant reference indicator continuously during a game time period and a temporary reference indicator temporarily in the game time period;
display, on the display screen, a surrounding object which surrounds the temporary reference indicator;
make the surrounding object shrink toward the temporary reference indicator;
make a first success failure determination, based at least in part on: the timing of receiving the input of the user's operation, and a timing that the moving object moving toward the constant reference indicator reaches the constant reference indicator; and
make a second success failure determination, based at least in part on: the timing of receiving the input of the user's operation, and a timing that the moving object shrinking toward the temporary reference indicator reaches the temporary reference indicator.

19. The game program product according to claim 2,
wherein the computer program is, when executed by the computer, configured to cause the computer to further:
display, on the display screen, the reference indicator as a constant reference indicator continuously during a game time period and a temporary reference indicator temporarily in the game time period;
display, on the display screen, a surrounding object which surrounds the temporary reference indicator;
make the surrounding object shrink toward the temporary reference indicator;
make a first success failure determination, based at least in part on: the timing of receiving the input of the user's operation, and a timing that the moving object moving toward the constant reference indicator reaches the constant reference indicator; and make a second success failure determination, based at least in part on: the timing of receiving the input of the user's operation, and a timing that the moving object shrinking toward the temporary reference indicator reaches the temporary reference indicator.

20. A game system comprising:
a display that displays at least: 1) a reference indicator at a position over a display screen; and 2) a moving object which moves toward the reference indicator on the display screen;
a controller configured to change the position of the reference indicator displayed over the display screen;
a receiver configured to receive an input of a user's operation; and
a determiner configured to determine success or failure of the user's operation, based at least in part on: a timing of receiving the input of the user's operation, and a timing that the moving object reaches the reference indicator,
wherein the reference indicator is associated with a plurality of paths on which the moving object is movable over the display screen,
wherein the plurality of paths extend straight from positions on the display screen to the reference indicator, the plurality of paths include at least two paths which are not parallel to each other,
wherein the plurality of paths extend from different positions on edges of the display screen to the reference indicator, the plurality of paths include at least two paths which are not parallel to each other,
wherein the display is configured to display, based on a path identification information, the moving object to move on an identified path of the plurality of paths from a first position, among the different positions on the edges of the display screen, to the reference indicator, where the identified path is identified by the path identification information,
wherein the path identification information identifies the identified path on which the moving object reaches the reference indicator at a prescribed arrival time, and
wherein the computer program is, when executed by the computer of the game system, configured to cause the computer to further at least:
display, on the display screen, 3) a change indicator, which indicates as a user's operation guide, the timing of a user's operation for changing the position of an outside edge of the reference indicator, by changing a size of the reference indicator or by moving a position of the reference indicator, with reference to the change indicator displayed on the display screen;
change, in accordance with the input, the position of the outside edge of the reference indicator over the display screen; and
perform a change success failure determination based on the timing that the input is received and on the timing indicated by the change indicator.

\* \* \* \* \*